United States Patent [19]

Doko et al.

[11] Patent Number: 5,744,255
[45] Date of Patent: Apr. 28, 1998

[54] ALUMINUM ALLOY BRAZING MATERIAL AND BRAZING SHEET ADAPTABLE FOR HEAT EXCHANGES

[75] Inventors: Takeyoshi Doko; Koji Okada; Tokinori Onda; Hiroaki Takeuchi; Yoji Hirano, all of Tochigi, Japan

[73] Assignees: Furukawa Electric Co., Ltd., Tokyo, Japan; Nippondenso Co., Ltd., Kariya, Japan

[21] Appl. No.: 707,091

[22] Filed: Sep. 3, 1996

Related U.S. Application Data

[63] Continuation of Ser. No. 189,976, Feb. 1, 1994, abandoned.

[30] Foreign Application Priority Data

| Aug. 3, 1993 | [JP] | Japan | 5-212377 |
| Aug. 6, 1993 | [JP] | Japan | 5-214879 |
| Aug. 10, 1993 | [JP] | Japan | 5-218019 |
| Aug. 31, 1993 | [JP] | Japan | 5-238971 |
| Aug. 31, 1993 | [JP] | Japan | 5-240563 |
| Sep. 6, 1993 | [JP] | Japan | 5-245967 |
| Sep. 6, 1993 | [JP] | Japan | 5-245968 |
| Sep. 7, 1993 | [JP] | Japan | 5-242106 |
| Sep. 30, 1993 | [JP] | Japan | 5-267962 |

[51] Int. Cl.$^6$ ............... B32B 15/20; F28F 19/06; F28F 21/08
[52] U.S. Cl. ............... 428/654; 428/933; 165/134.1; 165/905
[58] Field of Search ............... 428/654, 933; 165/134.1, 905

[56] References Cited

U.S. PATENT DOCUMENTS

| 3,168,381 | 2/1965 | Finnegan et al. | 29/197.5 |
| 3,788,824 | 1/1974 | Singleton, Jr. et al. | 29/197.5 |
| 3,963,453 | 6/1976 | Singleton, Jr. | 75/147 |
| 3,994,695 | 11/1976 | Setzer et al. | 29/197.5 |
| 4,196,262 | 4/1980 | Pryer et al. | 428/654 |
| 4,209,059 | 6/1980 | Anthony et al. | 428/654 |
| 4,211,827 | 7/1980 | Pryor et al. | 428/654 |
| 4,317,484 | 3/1982 | Tanabe et al. | 428/654 |
| 4,636,356 | 1/1987 | Iwasaki et al. | 428/654 |
| 4,727,001 | 2/1988 | Takemoto et al. | 428/654 |
| 4,761,267 | 8/1988 | Takeno et al. | 428/654 |
| 4,788,037 | 11/1988 | Kaifu et al. | 420/534 |
| 4,828,936 | 5/1989 | Toma et al. | 428/654 |
| 5,292,595 | 3/1994 | Yamauchi et al. | 428/654 |
| 5,351,750 | 10/1994 | Garcia | 428/654 |
| 5,356,725 | 10/1994 | Eichhorn et al. | 428/654 |

*Primary Examiner*—John J. Zimmerman
*Attorney, Agent, or Firm*—Morrison Law Firm

[57] ABSTRACT

A typical aluminum alloy brazing material includes over 7.0 wt. % and not more than 12.0 wt. % of Si: over 0.1 wt. % and not more than 8.0 wt. % of Cu, over 0.05 wt. % and not more than 0.5 wt. % or Fe, further at least one kind selected from a group consisting of over 0.5 wt. % and not more than 5.5 wt. % of Zn, over 0.002 wt. % and not more than 0.3 wt % of In and over 0.002 wt. % and not more than 0.3 wt. % of Sn, and the balance of Al an inevitable impurities. A typical cladded aluminum alloy brazing sheet with a three-layer structure includes a brazing material, a core material comprising over 0.6 wt. % and not more than 2.5 wt. % of Si, over 0.5 wt. % and not more 2.5 wt. % of Cu, over 0.05 wt. % and not more than 2.0 wt. % of Mn, and the balance of Al and inevitable impurities, and a sacrificial material comprising at least one kind selected from a group consisting of over 0.5 wt. % and not more than 6.0 wt. % of Zn, over 0.002 wt. % and not more than 0.3 wt. % of In, and over 0.002 wt. % and not more than 0.3 wt. % of Sn, and the balance of Al and inevitable impurities, or comprises a core material cladded both sides thereof with the brazing material. By using the inventive brazing materials or brazing sheets, the brazing heating can be performed at a temperature of 570° to 585° C.

20 Claims, 2 Drawing Sheets

5,744,255

ALUMINUM ALLOY BRAZING MATERIAL AND BRAZING SHEET ADAPTABLE FOR HEAT EXCHANGES

This application is a continuation of application Ser. No. 08/189,976, filed Feb. 1, 1994, now abandoned.

BACKGROUND OF THE INVENTION

The present invention relates to a brazing material used for fabricating aluminum alloy heat-exchangers for automobiles etc., an aluminum alloy brazing sheet for heat-exchangers used as a constitutional component of aluminum heat-exchangers, and a method for fabricating aluminum heat-exchangers used them. More specifically, it provides a brazing material and brazing sheet for fabricating aluminum alloy heat-exchangers with excellent thermal efficiency, high strength and excellent corrosion resistance by brazing technique, and a brazing method using them.

There are a radiator, condenser, evaporator, etc. for the heat-exchangers for automobiles. In the radiator thereamong, as shown in FIG. 1 for example, a thin-wall fin (2) machined in corrugated shape is formed unitedly between a plurality of flat tubes (1), both ends of said flat tubes (1) open respectively in the spaces constituted by a header (3) and a tank (4), a high temperature refrigerant is fed from the space of one tank side to the space of other tank (4) side through the flat tube (1), thereby heat-exchanging at the portions of flat tube (1) and fin (2), and the refrigerant having become lower temperature is circulated again.

For the tube material and the header material of such heat-exchanger, a brazing sheet is used, comprising, for example JIS 3003 alloy (Al-0.15 wt. % Cu-1.1 wt. % Mn) core material, cladded the inside of said core material or the side always contacting with refrigerant with JIS 7072 alloy (Al-1 wt. % Zn) as a lining material and the outside of said core material, ordinarily with brazing material such as 4045 alloy (Al-10 wt. % Si), and this is assembled unitedly together with the corrugated fin and other components by brazing.

Moreover, FIG. 2 shows a serpentine type condenser, in which a tube material (5) formed tubularly by hot or warm extrusion is folded serpentinely and a corrugated fin (6) comprising brazing sheet is attached between the openings of tube material. Besides, numeral (7) shows a connector. For the tube material, JIS 3003 alloy etc. are used, and, for the fin, JIS 3003 alloy or an alloy containing Zn etc. for the purpose of giving the sacrificial effect thereto is used as a core material, and a brazing material such as JIS 4045 alloy or JIS 4343 alloy (Al-7.5 wt. % Si) is cladded on both sides.

Furthermore, in FIG. 3, a multilayer type evaporator is shown. In this evaporator, fin (2) and pathway-constituting sheets (9) and (9') forming path ways (8) and (8') of refrigerant and comprising brazing sheet are layered alternatively, and they are joined by brazing. For this fin, an about 0.08 mm thick fin material is used ordinarily, and, for the refrigerant pathway-constituting sheet, on about 0.4 mm thick brazing sheet is used.

In such evaporator, for preventing the external corrosion of the pathway of refrigerant, a fin material with sacrificial anode effect is used and, for the refrigerant pathway-constituting sheet, a brazing sheet is used, comprising a core material of Al-1 wt. % Mn alloy, an alloy added with Cu, Zn, etc. thereto, if necessary, or the like, cladded the surface thereof with brazing material such as JIS 4004 alloy or JIS 4343 alloy. And, all of these heat-exchangers are assembled by brazing to heat to a temperature near 600° C., and the brazing techniques include vacuum brazing method, flux brazing method, Nocolock brazing method using noncorrosive flux and the like.

By the way, recently, the heat-exchangers are in a direction of lightening in weight and miniaturizing, and, for this reason, thinning of wall of materials is desired. However, if thinning of wall is made with conventional materials, many problems arise.

Firstly, as the wall thickness of materials for refrigerant pathway-constituting component (tube material etc.) as well as the fin decrease, it is necessary to increase the strength. Hence, several high-strength alloys have been proposed, but sufficient strength is still not obtained. This is because of that the addition of alloy elements is necessary for improved strength, but, if alloy elements are added, the melting point decreases, leading to melting during the brazing to heat to a temperature near 600° C.

Moreover, the phenomena of the buckling of fin during brazing and the diffusion of brazing material into fin leading to melting tend to happen as the thickness of fin decrease, hence, in the case of brazing sheet fin, it is said that the thickness of 100 μm is a limit of thinning. If the buckling occurs, then the thermal efficiency of heat-exchanger decreases by the increased ventilation resistance.

As a result of intensive investigations in view of this situation, an aluminum alloy brazing sheet for heat-exchangers with excellent strength and corrosion resistance after brazing, and a production method of aluminum alloy heat-exchangers capable of lightening the weight and miniaturizing and excellent in thermal efficiency have been developed by the invention.

SUMMARY OF THE INVENTION

The first of the invention provides an aluminum alloy brazing material capable of lowering the brazing temperature, and is concerned with an aluminum alloy brazing material characterized by comprising over 7.0 wt. % and not more than 12.0 wt. % of Si, over 0.1 wt. % and not more than 8.0 wt. % of Cu, over 0.05 wt. % and not more than 0.5 wt. % of Fe, further at least one kind selected from a group consisting of over 0.5 wt. % and not more than 5.5 wt. % of Zn, over 0.002 wt. % and not more than 0.3 wt. % of In and over 0.002 wt. % and not more than 0.3 wt. % of Sn, and the balance of Al and inevitable impurities.

Moreover, other brazing material of the invention is an aluminum alloy brazing material characterized by comprising over 7.0 wt. % and not more than 12.0 wt. % of Si, over 0.8 wt. % and not more than 3.0 wt. % of Cu, over 0.05 wt. % and not more than 0.4 wt. % of Fe, over 1.0 wt. % and not more than 5.0 wt. % of Zn, or further one or two kinds of over 0.002 wt. % and not more than 0.05 wt. % of In and over 0.002 wt. % and not more than 0.05 wt. % of Sn, and the balance of Al and inevitable impurities.

Furthermore, an aluminum alloy brazing sheet of the invention with excellent strength and corrosion resistance after brazing, usable as the flat tube (1) and the header (3) comprising the seam welded pipe of radiator shown in FIG. 1, is characterized in that, in the aluminum alloy brazing sheet for heat-exchangers having a three-layer structure cladded one side of core material consisting of aluminum alloy with brazing material consisting of aluminum alloy and cladded other side with sacrificial material consisting of aluminum alloy, an aluminum alloy comprising over 7.0 wt. % and not more than 12.0 wt. % of Si, over 0.1 wt. % and not more than 8.0 wt. % of Cu, over 0.05 wt. % and not more than 0.5 wt. % of Fe, further at least one kind selected from a group consisting of over 0.5 wt. % and not more than 5.5 wt. % of Zn, over 0.002 wt. % and not more than 0.3 wt. % of In and over 0.002 wt. % and not more than 0.3 wt. % of Sn, and the balance of Al and inevitable impurities is used for the brazing material, an aluminum alloy comprising over 0.6 wt. % and not more than 2.5 wt. % of Si, over 0.5 wt. % and not more than 2.5 wt. % of Cu, over 0.05 wt. % and not more than 2.0 wt. % of Mn, or further at least one kind selected from a group consisting of over 0.03 wt. % and not more than 0.5 wt. % of Mg, over 0.03 wt. % and not more than 0.3 wt. % of Cr, over 0.03 wt. % and not more than 0.3 wt. % of Zr, over 0.03 wt. % and not more than 0.3 wt. % of Ti and over 0.03 wt. % and not more than 1.5 wt. % of Ni, and the balance of Al and inevitable impurities is used for the core material, and an aluminum alloy comprising at least one kind selected from a group consisting of over 0.5 wt. % and not more than 6.0 wt. % of Zn, over 0.002 wt. % and not more than 0.3 wt. % of In and over 0.002 wt. % and not more than 0.3 wt. % of Sn, or further one or two kinds of over 0.05 wt. % and not more than 2.5 wt. % of Mg and over 0.05 wt. % and not more than 1.6 wt. % of Mn, and the balance of Al and inevitable impurities is used for the sacrificial material.

Still more, an aluminum alloy brazing sheet of the invention, usable as the refrigerant pathway-constituting sheets (9) and (9') of multilayer type evaporator shown in FIG. 3 or the corrugated fin (6) of condenser shown in FIG. 2, is characterized by comprising a core material used an aluminum alloy comprising over 0.6 wt. % and not more than 2.5 wt. % of Si, over 0.5 wt. % and not more than 2.5 wt. % of Cu, over 0.05 wt. % and not more than 2.0 wt. % of Mn, or further at least one kind selected from a group consisting of over 0.03 wt. % and not more than 0.5 wt. % of Mg, over 0.03 wt. % and not more than 0.3 wt. % of Cr, over 0.03 wt. % and not more than 0.3 wt. % of Zr, over 0.03 wt. % and not more than 0.3 wt. % of Ti and over 0.03 wt. % and not more than 1.5 wt. % of Ni, and the balance of Al and inevitable impurities, cladded both sides thereof with an aluminum alloy brazing material comprising over 7.0 wt. % and not more than 12.0 wt. % of Si, over 0.1 wt. % and not more than 8.0 wt. % of Cu, over 0.05 wt. % and not more than 0.5 wt. % of Fe, further at least one kind selected from a group consisting of over 0.5 wt. % and not more than 5.5 wt. % of Zn, over 0.002 wt. % and not more than 0.3 wt. % of In and over 0.002 wt. % and not more than 0.3 wt. % of Sn, and the balance of Al and inevitable impurities.

Still more, an aluminum alloy brazing sheet of the invention, usable for the aluminum alloy fin for obtaining light-weight heat-exchangers with excellent thermal efficiency, is characterized by comprising a core material used an aluminum alloy comprising over 0.03 wt. % and not more than 2.5 wt. of Si, over 0.05 wt. % and not more than 2.0 wt. of Fe, over 0.05 wt. % and not more than 2.0 wt. % of Cu, over 0.6 wt. % and not more than 2.0 wt. % of Mn, further at least one kind selected from a group consisting of over 0.05 wt. % and not more than 5.0 wt. % of Zn, over 0.002 wt. % and not more than 0.3 wt. % of In and over 0.002 wt. % and not more than 0.3 wt. % of Sn, or further at least one kind selected from a group consisting of over 0.03 wt. % and not more than 0.5 wt. % of Mg, over 0.05 wt. % and not more than 2.0 wt. % of Ni, over 0.03 wt. % and not more than 0.3 wt. % of Cr, over 0.03 wt. % and not more than 0.3 wt. % of Zr and over 0.03 wt. % and not more than 0.3 wt. % of Ti, and the balance of Al and inevitable impurities, cladded both sides thereof with an aluminum alloy brazing material comprising over 7.0 wt. % and not more than 12.0 wt. % of Si, over 0.1 wt. % and not more than 8.0 wt. % of Cu, over 0.05 wt. % and not more than 0.5 wt. % of Fe, further at least one kind selected from a group consisting of over 0.5 wt. % and not more than 5.5 wt. % of Zn, over 0.002 wt. % and not more than 0.3 wt. % of In and over 0.002 wt. % and not more than 0.3 wt. % of Sn, and the balance of Al and inevitable impurities.

Still more, other aluminum alloy brazing sheet of the invention, usable as the fin material, is characterized by comprising a core material used an aluminum alloy comprising over 0.03 wt. % and not more than 2.5 wt. % of Si, over 0.05 wt. % and not more than 2.0 wt. % of Fe, over 0.05 wt. % and not more than 2.0 wt. % of Cu, further at least one kind selected from a group consisting of over 0.05 wt. % and not more than 5.0 wt. % of Zn, over 0.002 wt. % and not more than 0.3 wt. % of In and over 0.002 wt. % and not more than 0.3 wt. % of Sn, or further at least one kind selected from a group consisting of over 0.03 wt. % and not more than 0.5 wt. of Mg, over 0.03 wt. % and not more than 0.6 wt. % of Mn, over 0.05 wt. % and not more than 2.0 wt. % of Ni, over 0.03 wt. % and not more than 0.3 wt. % of Cr, over 0.03 wt. % and not more than 0.3 wt. % of Zr and over 0.03 wt. % and not more than 0.3 wt. % of Ti, and the balance of Al and inevitable impurities, cladded both sides thereof with an aluminum alloy brazing material comprising over 7.0 wt. % and not more than 12.0 wt. % of Si, over 0.1 wt. % and not more than 8.0 wt. % of Cu, over 0.05 wt. % and not more than 0.5 wt. % of Fe, further at least one kind selected from a group consisting of over 0.5 wt. % and not more than 5.5 wt. % of Zn, over 0.002 wt. % and not more than 0.3 wt. % of In and over 0.002 wt. % and not more than 0.3 wt. % of Sn, and the balance of Al and inevitable impurities.

Still more, a method for fabricating the aluminum alloy heat-exchangers of the invention is characterized in that, in the method for fabricating heat-exchangers by joining the aluminum alloy components by brazing technique, the brazing heating is performed at a temperature of 570° to 585° C. by using brazing materials or brazing sheets described above.

DETAILED DESCRIPTION OF THE INVENTION

Figure 1:
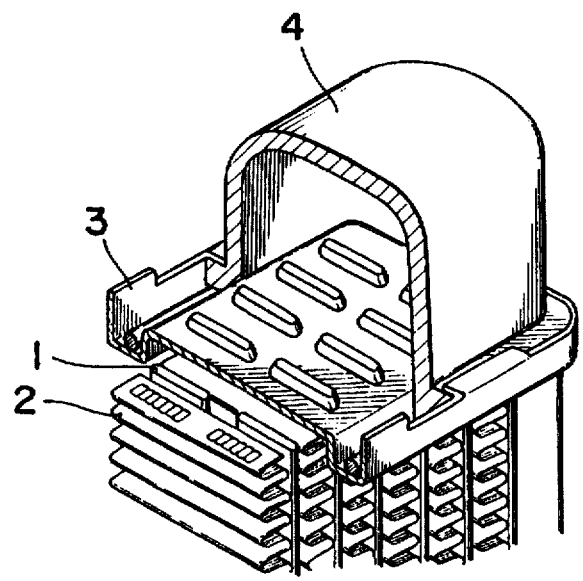
FIG. 1 is a partially sectional oblique view showing the radiator.

The constitutions of the invention are as described above. In following, each invention will be illustrated further. Firstly, the inventive brazing sheet for the tube and the header having a three-layer structure cladded one side of core material with brazing material and other side with sacrificial material is assembled directing the surface of brazing material to outside and the surface of sacrificial material to refrigerant pathway-constituting side.

And, the core material of this brazing sheet for the tube and the header is an aluminum alloy comprising over 0.6 wt. % and not more than 2.5 wt. % of Si, over 0.5 wt. % and not more than 2.5 wt. % of Cu, over 0.05 wt. % and not more than 2.0 wt. % of Mn, or further at least one kind selected from a group consisting of over 0.03 wt. % and not more than 0.5 wt. % of Mg, over 0.03 wt. % and not more than 0.3 wt. % of Cr, over 0.03 wt. % and not more than 0.3 wt. % of Zr, over 0.03 wt. % and not more than 0.3 wt. % of Ti and over 0.03 wt. % and not more than 1.5 wt. % of Ni, and the balance of Al and inevitable impurities.

The role of respective addition elements above and the reason for restriction will be illustrated.

Si contributes to the improvement in strength. However, if the amount is not more than 0.6 wt. %, then no effect is obtained. Moreover, the maximum addition level of Si at the conventional brazing temperature is 1 wt. % or so, but, in the invention, it is possible to increase the addition level of Si because of decreased brazing temperature. Moreover, if the addition level is not more than 1.2 wt. %, Si has a strength-improving effect as high as that of conventional refrigerant pathway-constituting component, but, through the simultaneous addition of Cu in amount over 0.5 wt. %, the strength improves more than conventional one, which will be described later. Further, if the addition level of Si is over 1.2 wt. %, a strength improvement larger than that of conventional one is possible. Besides, if the addition level of Si is over 1.2 wt. %, the corrosion resistance sometimes decrease. This is a phenomenon to cause through the generation of coarse Si compounds in the core material, hence it is preventable by controlling the production process so as the coarse compounds not to generate, taking the production process into consideration. And, if the addition level is over 2.5 wt. %, then the core material ends up to melt even at the brazing temperature of the invention.

Next, Cu exists in the alloy in a state of solid solution and improves the strength. If Cu is not more than 0.5 wt. %, the strength-improving effect is insufficient. The amount of Cu over 0.5 wt. % is an addition level characteristic of the invention among the addition levels of Cu. When using an alloy containing Cu for the core material, a decrease in the internal corrosion resistance (because Cu diffuses into the sacrificial layer during brazing, thereby the sacrificial layer becomes to have no effect as a sacrificial layer) and the generation of blistering corrosion (because a Cu-deficiency layer is created in the vicinity of the boundary between brazing material and core material) take place, hence the amount of Cu actually capable of adding to core material for the strength improvement was not more than 0.5 wt. % conventionally. On the contrary, in the invention, it has become possible to add even over 0.5 wt. % for the reason shown later in the description on brazing material and sacrificial material. In addition, Cu over 1.0 wt. % is a composition not used conventionally because of a decrease in melting point. However, if the amount of Cu is over 2.5 wt. % then the melting point decreases, leading to melting during brazing even if the brazing alloy of the invention may be used. Hence, the upper limit of Cu was made to be 2.5 wt. % and, in particular, an addition of 0.8 to 1.5 wt. % shows stable characteristics.

Mn distributes the intermetallic compounds throughout the alloy and is an essential element for improving the strength without decreasing the corrosion resistance. However, if the amount is under 0.05 wt. %, the strength is insufficient, and, if adding over 2.0 wt. %, the moldability decreases, resulting in the cracking of brazing sheet during processings such as assembling.

Mg exists in the alloy in a state of solid solution and as a fine precipitation phase of $Mg_2Si$ to improve the strength. However, if under 0.03 wt. %, no effect is obtained, and, if adding over 0.5 wt. %, then the flux and Mg reacts making the brazing impossible when brazing with a noncorrosive flux.

Cr, Zr and Ti all form fine intermetallic compounds and have an action to improve the strength of alloy. However, if under 0.03 wt. %, no effect is obtained, and, if adding each over 0.3 wt. %, then the moldability decreases, resulting in the cracking of brazing sheet during processings such as assembling.

Ni also forms the fine intermetallic compounds and has an action to improve the strength of alloy. However, if under 0.03 wt. %, no effect is obtained, and, if adding over 1.5 wt. %, then the moldability decreases, resulting in the cracking of brazing sheet during processings such as assembling.

The ingredients of the inventive core alloy are as described above. Besides, there is Fe as a representative element among the inevitable impurities. If not more than 1.2 wt. %, Fe may be contained. Also, the elements other than above such as B to be added for making the texture of cast ingot fine may be contained respectively, if not more than 0.05 wt. %.

Moreover, the brazing material of this brazing sheet for the tube and the header is, as described above, an aluminum alloy comprising over 7.0 wt. % and not more than 12.0 wt. % of Si, over 0.1 wt. % and not more than 8.0 wt. % of Cu, over 0.05 wt. % and not more than 0.5 wt. % of Fe, further at least one kind selected from a group consisting of over 0.5 wt. % and not more than 5.5 wt. % of Zn, over 0.002 wt. % and not more than 0.3 wt. % of In and over 0.002 wt. % and not more than 0.3 wt. % of Sn, and the balance of Al and inevitable impurities.

Conventionally, when using a high-strength core material alloy as in the invention, there were a problem that the external corrosion resistance of heat-exchanger decreased and a problem that the core material ally melted during brazing because of low melting point, hence the brazing sheet used such core material has not been used practically. The inventive brazing material alloy has solved these and, when combining with the inventive core material alloy, it exerts the effects namely, as a result of various investigations on the external corrosion resistance of heat-exchanger, it has been found that, when combining the brazing material alloy used conventionally with the inventive brazing material alloy, Cu added to the core material alloy diffuses into the brazing material during brazing to cause a low-Cu region in the vicinity of boundary between brazing material and core material and that place is corroded preferentially, thus causing an intense corrosion accompanied with the blistering. In the invention, Cu was added to the brazing material alloy to prevent the diffusion of Cu from core material to brazing material and not to cause the low-Cu region in the vicinity of boundary between brazing material and core material, thus improving the corrosion resistance. And, considering that, if the brazing can be made at a temperature near 580° C. in place of the conventional brazing at a temperature near 600° C., the melting of core material alloy will disappear, an alloy with lower brazing temperature than that of conventional brazing material alloy has been developed.

The role of respective addition elements above and the reason for restriction will be illustrated below.

Si lowers the melting point of alloy, but, if the amount is not more than 7.0 wt. %, the melting point does not decrease enough and the brazing is impossible at a temperature below 585° C. In addition, if the amount is over 12.0 wt. %, the melting point increases inversely, making it impossible to braze at a temperature below 585° C.

Cu lowers the melting point of alloy and improves the flowability of brazing material. In addition, Cu has an action to enhance the external corrosion resistance of heat-exchanger when using an alloy added with Cu for the refrigerant pathway-constituting component. Namely, as described above, it makes not causing the low-Cu region in the vicinity of boundary between brazing material and pathway constituting component, thus improving the corrosion resistance. Here, if the amount of Cu is not more than 0.1 wt. %, said effect is insufficient and, if the amount is over 8.0 wt. %, then the electrical potential of brazing material becomes too noble to preferentially corrode the refrigerant pathway-constituting component, resulting in the decreased rolling processing of alloy as well as the decreased corrosion resistance, thus making unsuitable as a brazing material to be used for the brazing sheet for heat-exchangers. For this reason, Cu was made to be over 0.1 wt. % and not more than 8.0 wt. %, but it shows stable characteristics at 0.5 to 3.5 wt. %, in particular. Besides, it shows excellent flowability of brazing material and rolling processing at over 0.8 wt. % and not more than 3.0 wt. %, in particular, because the melting point of mother material becomes higher if not more than 0.8 wt. % and said characteristics end up to decrease if over 3.0 wt. %.

Fe has an action to enhance the strength of fillet by making the crystal grains fine at the time of the solidification of brazing material after melting. It is added for this reason. However, if the amount is not more than 0.05 wt. %, the effect is insufficient and, if over 0.5 wt. %, then the intermetallic compounds are formed when the brazing material solidifies, thus making these as starting points of corrosion. It shows excellent external corrosion resistance at not more than 0.4 wt. %, in particular.

The addition of Zn lowers the melting point of alloy. Moreover, in the case of brazing material alloy added with Cu as in the invention, the generation of blistering due to external corrosion may be suppressed, but the electrical potential of brazing material becomes nobler than that of core material, hence a problem that the external corrosion progresses pit-like at higher speed arises. For this reason, Zn is added to lower the electrical potential of brazing material and bring the electrical potential of brazing material close to that of core material, thus improving the corrosion resistance. However, if the amount is under 0.5 wt. %, the effect is insufficient and, if the amount is over 5.5 wt. %, the rolling processibility of alloy decreases, leading to unsuitable brazing material to be used for the brazing sheet for heat-exchangers. Besides, taking the flowability of brazing material into consideration, addition of 1 to 5 wt. % is recommended, in particular.

In and Sn are added also for the same purpose as Zn. Namely, they make the electrical potential of brazing material base to improve the corrosion resistance of refrigerant pathway-constituting component. However, if the amount is not more than 0.002 wt. %, the effect is insufficient and, if the amount is over 0.3 wt. %, then the rolling processibility of alloy decreases.

The alloy composition of brazing material is as described above. The inevitable impurity elements may be contained, if they are not more than 0.05 wt. %, respectively.

Furthermore, the sacrificial material of this brazing sheet for the tube and the header is, as described above, an aluminum alloy comprising at least one kind selected from a group consisting of over 0.5 wt. % and not more than 6.0 wt. % of Zn, over 0.002 wt. % and not more than 0.3 wt. % of In and over 0.002 wt. % and not more than 0.3 wt. % of Sn, or further one or two kinds of over 0.05 wt. % and not more than 2.5 wt. % of Mg and over 0.05 wt. % and not more than 1.6 wt. % of Mn, and the balance of Al and inevitable impurities.

As a representative of conventional sacrificial material alloy, JIS 7072 alloy can be mentioned, but, when combining such conventional sacrificial material alloy with said core material alloy with high Cu content concerning with the invention, Cu added to the core material alloy diffuses into the sacrificial material during brazing to extinguish the sacrificial effect of sacrificial material. For this reason, it is conceivable to increase Zn in the sacrificial material, but, if Zn is increased, then the melting point of sacrificial material decreases, leading to melting during brazing. However, in the invention, since low-melting point brazing material alloy is used as described above, it is possible to increase Zn.

The addition of Zn provides the sacrificial effect to alloy. However, if the amount is under 0.5 wt. %, the effect is insufficient and, if the amount is over 6.0 wt. %, then the melting point decreases, leading to melting during brazing even if the inventive brazing material alloy may be used.

The addition of In and Sn also provides the sacrificial effect to alloy. However, if the amount is under 0.002 wt. % the effect is insufficient and, if over 0.3 wt. %, then the rolling processibility of alloy decreases, leading to unsuitable sacrificial material for the brazing sheet with three-layer structure.

The addition of Mg makes the strength of sacrificial material alloy high and improves the strength of material totally. However, if the amount is under 0.05 wt. %, no effect is obtained, and if over 2.5 wt. %, then the melting point decreases, leading to melting during brazing even if the inventive brazing material ally may be used.

The addition of Mn also makes the strength of sacrificial material high and improves the strength of material totally. However, if the amount is under 0.05 wt. %, no effect is obtain and, if over 1.6 wt. %, then the rolling processibility of alloy decreases, leading to unsuitable sacrificial material to be used for the brazing sheet with three-layer structure.

The alloy elements in the inventive sacrificial material are as described above. As the inevitable impurities, Si can be contained if not more than 0.5 wt. %, but it is desirable to be not more than 0.1 wt. %. Fe can also be contained if not more than 0.8 wt. %, but is is desirable to be not more than 0.1 wt. %. Also, the elements other than above such as Cr, Zr and Ti for improving the strength may be contained as the impurity elements, if not more than 0.05 wt. %, resectively.

Next, the constitution of the inventive brazing sheet for the refrigerant pathway-constituting sheet cladded both sides of the core material with brazing sheet comprises a combination of an aluminum alloy core material comprising over 0.6 wt. % and not more than 2.5 wt. % of Si, over 0.5 wt. % and not more than 2.5 wt. % of Cu, over 0.05 wt. % and not more than 2.0 wt. % of Mn, or further at least one kind selected from a group consisting of over 0.03 wt. % and not more than 0.5 wt. % of Mg, over 0.03 wt. % and not more than 0.3 wt. % of Cr, over 0.03 wt. % and not more than 0.3 wt. % of Zr, over 0.03 wt. % and not more than 0.3 wt. % of Ti and over 0.03 wt. % and not more than 1.5 wt. % of Ni, and the balance of Al and inevitable impurities with an aluminum alloy brazing material comprising over 7.0 wt. % and not more than 12.0 wt. % of Si, over 0.1 wt. % and not more than 8.0 wt. % of Cu, over 0.05 wt. % and not more than 0.5 wt. % of Fe, further at least one kind selected from a group consisting of over 0.5 wt. % and not more than 5.5 wt. % of Zn, over 0.002 wt. % and not more than 0.3 wt. % of In and over 0.002 wt. % and not more than 0.3 wt. % of Sn, and the balance of Al and inevitable impurities.

Namely, these alloy compositions of core material and brazing material are same as those of core material and brazing material of said brazing sheet for the tube and the header and the role of addition elements and the reason for restriction are also same.

Next, the inventive brazing sheet for high-strength aluminum alloy fin will be illustrated. Firstly, the development thought thereof is described below.

When fabricating the aluminum alloy heat-exchanger by the brazing technique as above, the heating is conducted ordinarily at a temperature near 600° C. Since this temperature of 600° C. is considerably high temperature for fin material, there arise following three problems: i.e. ①the fin buckles during heating, ② the intermetallic compounds in alloy reform the said solution to decrease the thermal conductivity of fin, and ③ low-melting point, high-strength alloy cannot be used.

The inventors made the investigations diligently to solve these problems and considered that it would be effective to decrease the heating temperature for brazing. As a result of the investigations on what degrees or lower the temperature should be decreased to to be able to solve these problematic points, it has been found that, if not higher than 585° C., the buckling of fin becomes hard to occur during brazing, the decrease in thermal conductivity becomes slight, and, by increasing the addition level of Si, the strength of alloy can improve.

Said three points are explained in more detail. ①. Most of the buckling of fin generates due to the high-temperature creep phenomenon causing in the fin at high temperature, and it has been found that, forming a boundary in the vicinity of 590° C. said creep phenomenon occurs suddenly at a temperature higher than that (the fin becomes weak). For this reason, if not higher than 585° C., the buckling originating from this does not occur. In addition, there is a buckling originating from the diffusion of brazing material into fin, but it has been found that, forming a boundary in the vicinity of 595° C., the diffusion of brazing material occurs suddenly at a temperature higher than that. For this reason, if not higher than 585° C., the diffusion of brazing material becomes low and the buckling of fin becomes hard to occur totally.

② The thermal conductivity of fin to perform the brazing decreases due to that the intermetallic compounds having precipitated in aluminum alloy reform the solid solution during heating for brazing. And, the higher the heating temperature, the higher the limit of forming solid solution and the higher the diffusion velocity, thus allowing easy progress of reforming of solid solution. For this reason, it has been found that decreasing the brazing temperature has an effect to enhance the thermal conductivity and that, if not higher than 585° C., the progressing velocity of reforming of solid solution is low and the decrease in thermal conductivity is also low.

③ With respect to the strength, the elements to be added for high-strength aluminum alloy include Cu, Mg, Si, etc. But, when using as a refrigerant pathway-constituting component, the corrosion resistance and the brazability should be taken into consideration, and, when using as a fin, the sacrificial effect, thermal conductivity and brazability should be considered. Hence, the elements capable of increasing the addition level for improved strength are restricted and the addition of Si is influential concretely. The amount of Si or the amount of Cu capable of adding on brazing at 600° C. is as low as 1 wt. %, but it becomes possible to add as high as 2.5 wt. % at 585° C. or lower.

Now, as a method for brazing at a temperature lower than the usual brazing temperature in this way, a method for brazing at a temperature in front and behind 500° C., which is called low-temperature brazing, is known (e.g. Japanese Unexamined Patent Publication No. Hei 1-107961). This method has a problematic point that the brazing material tends to be corroded after brazing, since Al-Zn alloy or Zn alloy containing not less than 20% of Zn is used usually as a brazing material, hence they are not used actually for the production of heat-exchangers. In addition, with Al-Zn alloy, if the addition level of Zn is over 8%, the rolling property becomes very poor, making the production of brazing sheet by ply rolling, impossible, hence no production method for supplying the brazing sheet for low-temperature brazing in stable state industrially has been established. For this reason, the brazing material must be used as pieces of brazing material etc., limiting the type of components producible. The inventors, however, have found that the improvement in the characteristics of heat-exchanger is possible even at a brazing temperature of not higher than 585° C. being far higher temperature than that of low-temperature brazing as described above, and considered that the development of fin alloy suitable therefor was possible, leading to the invention.

Here, there have been alloys known as aluminum alloy brazing materials with low melting point so far (e.g. Japanese Unexamined Patent Publication No. Hei 3-57588). These were developed mainly for brazing the castings and, since they contain a lot of Cu or they are added with Zn over 8% as described above, they have a problem to cause cracks when performing the rolling processing, making the production of brazing sheet impossible. If impossible to use as a brazing sheet, the practicality would be poor for fabricating the heat-exchangers industrially and the inventive method would not be realized.

The type and the symbol of brazing materials used so far and laid down in JIS are shown in Table 1 and the chemical compositions in Table 2. In Table 1, the solidus line temperature, liquidus line temperature and brazing temperature are listed for reference.

TABLE 1

Type and symbol of brazing and skin material (JIS Z 3263)

| | | | | Reference | | |
|---|---|---|---|---|---|---|
| | Type | | | Solidus line temp. (°C.) | Liquidus line temp. (°C.) | Brazing temp. (°C.) |
| No. of alloy | Shape | Call no.[(2)] | Symbol[(3)] | | | |
| 4343 | Plate, strip Skin material | 1 | BA4343P — | 577 | 615 | 600–620 |
| 4045 | Wire Rod Plate, strip Skin material | 2 | BA4045W BA4045B BA4045P — | " | 590 | 590–605 |
| 4004[(1)] | Wire Rod Plate, strip Skin material | 3 | — | 559 | 591 | 590–605 |
| 4005[(1)] | Wire Rod Plate, strip Skin material | 4 | — | " | 582 | 585–605 |
| 4N04[(1)] | Wire Rod Plate, strip Skin material | 5 | — | " | 579 | 580–600 |
| 4104[(1)] | Wire Rod Plate, strip | 6 | — | " | 591 | 590–605 |

TABLE 1-continued

Type and symbol of brazing and skin material (JIS Z 3263)

| | Type | | | Reference Solidus line temp. (°C.) | Reference Liquidus line temp. (°C.) | Brazing temp. (°C.) |
|---|---|---|---|---|---|---|
| No. of alloy | Shape | Call no.(2) | Symbol(3) | | | |
| 4N43 | Skin material Wire Rod Plate, strip | 7 | — | 576 | 609 | 600–620 |
| 4N45 | Skin material Wire Rod Plate, strip | 8 | — | " | 588 | 590–605 |
| 4145 | Skin material Rod | — | BA4145B | 520 | 585 | 570–605 |
| 4047 | Wire Rod Skin material | — | BA4047W BA4047B BA4047P | 577 | 580 | 580–605 |

Note:
(1)To be used as a skin material of brazing sheet for vacuum brazing.
(2)Call no. of brazing material as a skin material.
(3)Symbol on using as a brazing material solely.

The lower limit of the brazing temperature listed here is a temperature of brazing material starting to flow, which is a temperature usable on tentatively brazing small-sized items such as T joint. However, the heat-exchangers are large-sized and, when brazing them industrially, the temperatures differ by about 5° to 10° C. from place to place. For this reason, the temperature to be retained on brazing the heat-exchangers is a temperature higher by at least 5° to 10° C. than this lower-limit temperature.

Namely, at a first glance, 4047 alloy and 4N04 alloy look like brazing material alloys usable in the same temperature range as the inventive brazing material, but they are different really, and the brazing at a temperature to perform using the inventive brazing material alloy has not been carried out industrially.

Although 4145 alloy is a brazing material usable in the brazing temperature range to perform using the inventive brazing material alloy, it has not been used as a brazing material for the brazing sheet used for heat-exchangers. Detailed reason will be described in the restrictive reason for the composition of the inventive brazing material, but because of that 4145 alloy differs from the inventive composition in the points of higher upper limit of Fe than the inventive brazing material alloy and of having no Zn, In and Sn added, thus being poor in the external corrosion resistance. For this reason, no merit achievable by making the brazing temperature of heat-exchangers not higher than 585° C. as described in the invention has been known.

Moreover, the invention of U.S. Pat. No. 3,994,695 relates to a brazing sheet, but the focus is placed on the development of core material alloy, allowing to clad with any brazing material. This fact is obvious from no descriptions on the brazing material in all of Examples 1 through 4 and is also obvious from no descriptions on the adding reason of alloy elements in the specification. In this invention, the description on the brazing material covers only 12 lines from page 2, line 40 to page 2, line 52, and the difference between the alloys (4343, 4145, 4047, 4045 and X4004) described as

TABLE 2

Chemical composition of brazing materials (JIS Z 3263)

| No. of alloy | Si | Fe | Cu | Mn | Mg | Cr | Zn | Ti | Bi | Others(5) individual | Others(5) Total | Al |
|---|---|---|---|---|---|---|---|---|---|---|---|---|
| 4343 | 6.8–8.2 | 0.8 or less | 0.25 or less | 0.10 or less | — | — | 0.20 or less | — | — | 0.05 or less | 0.15 or less | Bal. |
| 4045 | 9.0–11.0 | 0.8 or less | 0.30 or less | 0.05 or less | 0.05 or less | — | 0.10 or less | 0.20 or less | — | 0.05 or less | 0.15 or less | " |
| 4004 | 9.0–10.5 | 0.8 or less | 0.25 or less | 0.10 or less | 1.0–2.0 | — | 0.20 or less | — | — | 0.05 or less | 0.15 or less | " |
| 4005 | 9.5–11.0 | 0.8 or less | 0.25 or less | 0.10 or less | 0.20–1.0 | — | 0.20 or less | — | — | 0.05 or less | 0.15 or less | " |
| 4N04 | 11.0–13.0 | 0.8 or less | 0.25 or less | 0.10 or less | 1.0–2.0 | — | 0.20 or less | — | — | 0.05 or less | 0.15 or less | " |
| 4104 | 9.0–10.5 | 0.8 or less | 0.25 or less | 0.10 or less | 1.0–2.0 | — | 0.20 or less | — | 0.02–0.20 | 0.05 or less | 0.15 or less | " |
| 4N43 | 6.8–8.2 | 0.8 or less | 0.25 or less | 0.10 or less | — | — | 0.5–2.5 | — | — | 0.05 or less | 0.15 or less | " |
| 4N45 | 9.0–11.0 | 0.8 or less | 0.30 or less | 0.05 or less | 0.05 or less | — | 0.5–2.5 | — | — | 0.05 or less | 0.15 or less | " |
| 4145 | 9.3–10.7 | 0.8 or less | 3.3–4.7 | 0.15 or less | 0.15 or less | 0.15 or less | 0.20 or less | — | — | 0.05 or less | 0.15 or less | " |
| 4047 | 11.0–13.0 | 0.8 or less | 0.30 or less | 0.15 or less | 0.10 or less | — | 0.20 or less | — | — | 0.05 or less | 0.15 or less | " |

Note:
(5)Other elements were analyzed as long as the existence is foreseen or any symptom exceeding the regulated range is seen in usual analyzical process.

examples and the inventive brazing materials is as described above. In addition, the brazing materials described in this invention and the inventive brazing materials are different in following points.

① A point approving the addition of Mg is different from the present invention. If adding Mg, then the flux and Mg react during brazing, making the brazing impossible.

② The composition range of Zn is wider. With an alloy over 6% of Zn, the rolling processibility is poor in the case of amounts of Si, Cu and Fe of the present invention, making the conversion to brazing sheet impossible.

③ No regulation of the amount of Fe. Hence, there are problems in the rolling processability and the external corrosion resistance.
④ Only the melting temperature of brazing materials is described and there is no description on the temperature of brazing.

Here, the core material in the first of the inventive brazing sheets for aluminum alloy fin is, as described above, an aluminum alloy comprising over 0.03 wt. % and not more than 2.5 wt. % of Si, over 0.05 wt. % and not more than 2.0 wt. % of Fe, over 0.05 wt % and not more than 2.0 wt. % of Cu, over 0.6 wt. % and not more than 2.0 wt. % of Mn, further at least one kind selected from a group consisting of over 0.05 wt. % and not more than 5.0 wt. % of Zn, over 0.002 wt. % and not more than 0.3 wt. % of In and over 0.002 wt. % and not more than 0.3 wt. % of Sn, or further at least one kind selected from a group consisting of over 0.03 wt. % and not more than 0.5 wt. % of Mg, over 0.05 wt. % and not more than 2.0 wt. % of Ni, over 0.03 wt. % and not more than 0.3 wt. % of Cr, over 0.03 wt. % and not more than 0.3 wt. % of Zr and over 0.03 wt. % and not more than 0.3 wt. % of Ti, and the balance of Al and inevitable impurities.

The role of respective addition elements above and the reason for restriction will be illustrated.

Si contributes to the improvement in strength. However, if the amount is not more than 0.03 wt. %, then no effect is obtained. The maximum addition level of Si at the conventional brazing temperature is 1 wt. % or so, but, in the invention, it is possible to increase the addition level of Si because of decreased brazing temperature. Namely, if the addition level is not more than 1.2 wt. %, Si has a strength-improving effect as high as that of conventional fin, but, if over 1.2 wt. %, a strength improvement larger than that of conventional one is possible. Besides, as the addition level of Si increases, the thermal conductivity decreases, hence it is possible to select the composition taking either property to be regarded as important between strength and conductivity into consideration upon fabricating the heat-exchangers. Besides, if the addition level of Si is over 2.5 wt. %, the core material ends up to melt even at the brazing temperature of the invention.

Fe forms the intermetallic compounds and contributes to the improvement in strength. However, if the amount is not more than 0.05 wt. %, no effect is obtained and, if over 2.0 wt. %, recrystallized grains of fin become fine and the diffusion of brazing material becomes significant to tend to collapse the fin.

Cu improves the strength. And, if the amount is not more than 0.05 wt. %, no effect is obtained and, if over 2.0 wt. %, the core material ends up to melt even at the brazing temperature of the invention.

Mn forms the fine intermetallic compounds in alloy and not only contributes to the improvement in strength, but also has an effect to prevent the recrystallized grains from becoming fine during heating for brazing. If the amount is not more than 0.6 wt. %, no effect is obtained and, if over 2.0 wt. %, the moldability of fin decreases, making the corrugating molding impossible.

Zn, In and Sn are elements to be added for providing the sacrificial anode effect to fin material. In the case of alloy added with Cu like the inventive alloy, if these elements are not added, then the electrical potential of fin becomes nobler than that of refrigerant pathway-constituting component, thus decreasing the corrosion resistance. And, with not more than 0.05 wt. % of Zn, not more than 0.002 wt. % of In and not more than 0.002 wt. % of Sn, said effect is insufficient and, if adding over 5.0 wt. % of Zn, over 0.3 wt. % of In and over 0.3 wt. % of Sn, the thermal conductivity decreases. In particular, in a range of higher addition level of Cu in the invention, addition of much Zn is needed, but, since Zn lowers the melting point of alloy, it could be added only up to about 2 wt. %.

Mg, Ni, Cr, Zr and Ti are elements to be added for further improving the strength. And, with not more than 0.03 wt. % of Mg, not more than 0.05 wt. % of Ni and not more than 0.03 wt. % of Cr, Zr and Ti, no effect is obtained. On the other hand, over 0.5 wt. % of Mg decrease the brazability and over 2.0 wt. % of Ni and over 0.3 wt. % of Cr, Zr and Ti decrease the moldability, making the corrugating molding of fin difficult. For this reason, the addition level of these elements was laid down within said ranges. As for Ti, however, the lower limit of the addition level thereof is 0.03 wt. % due to said action, but it is sometimes added for making the ingot texture fine and the lower limit at that time is made to be 0.001 wt. %.

Next, with respect to the inevitable impurities, there are B etc. to be added for making the ingot texture fine, and these elements may be contained safely if not more than 0.03 wt. %, respectively.

Moreover, the core material in the second of the inventive brazing sheets for aluminum alloy fin is, as described above, an aluminum alloy comprising over 0.03 wt. % and not more than 2.5 wt. % of Si, over 0.05 wt. % and not more than 2.0 wt. % of Fe, over 0.05 wt. % and not more than 2.0 wt. % of Cu, further at least one kind selected from a group consisting of over 0.05 wt. % and not more than 5.0 wt. % of Zn, over 0.002 wt. % and not more than 0.3 wt. % of In and over 0.002 wt. % and not more than 0.3 wt. % of Sn, or further at least one kind selected from a group consisting of over 0.03 wt. % and not more than 0.5 wt. % of Mg, over 0.03 wt. % and not more than 0.6 wt. % of Mn, over 0.05 wt. % and not more than 2.0 wt. % of Ni, over 0.03 wt. % and not more than 0.3 wt. % of Cr, over 0.03 wt. % and not more than 0.3 wt. % of Zr and over 0.03 wt. % and not more than 0.3 wt. % of Ti, and the balance of Al and inevitable impurities.

Regarding the role of respective elements above and the reason for restriction, Si, Fe, Cu, Zn, In and Sn being essential elements and Mg, Ni, Cr, Zr and Ti among selective elements have the same reason as the case of said inventive core material in the first of brazing sheets for fin. However, in this core material, over 0.03 wt. % and not more than 0.6 wt. % of Mn are selective for addition elements. This Mn is added for further improving the strength of said core material similarly to other selective elements, but, if the amount is not more than 0.03 wt. %, no effect is obtained and, if over 0.6 wt. %, then the thermal conductivity ends up to decrease. Moreover, the inevitable impurities in this core material alloy may also be contained safely if not more than 0.03 wt. %, respectively, similarly to the case of said first of brazing sheets for fin.

The inventive core material alloys in the first and the second of brazing sheets for fin are as described above. On the other hand, the brazing material to clad both sides thereof is made to be an aluminum alloy comprising over 7.0 wt. % and not more than 12.0 wt. % of Si, over 0.1 wt. % and not more than 8.0 wt. % of Cu, further at least one kind selected from a group consisting of over 0.5 wt. % and not more than 5.5 wt. % of Zn, over 0.002 wt. % and not more than 0.3 wt. % of In and over 0.002 wt. % and not more than 0.3 wt. % of Sn, and the balance of Al and inevitable impurities. The cladding rate of this brazing material onto core material is around 3 to 20% ordinarily. This composition of brazing material alloy is the same composition as the brazing material alloy of said other brazing sheets in the invention, hence the role of addition elements and the reason for restriction are also same.

Next, the production method of aluminum alloy heat-exchangers of the invention will be illustrated.

In the invention, brazing is performed at a temperature of 570° to 585° C. using said brazing materials and brazing sheets. This is because of that, if the brazing temperature is under 570° C., some have a composition not melting into the inventive brazing material, making the brazing impossible. Also, if over 585° C., then the thermal conductivity of fin decreases as described above and the buckling property at high temperature also decrease, leading to melting further. Besides, decreasing the brazing temperature in this way brings about effects of prolonged life of brazing furnace and improved corrosion resistance of refrigerant pathway-constituting component.

Here, while the brazing condition of the invention restricts the temperature as above, other conditions may be same as the conventional ones. Namely, flux brazing method, Nocolock brazing method using noncorrosive fluxs (fluoride type, cesium type, etc.) and the like have only to be used without particular restriction. The assembling, washing, flux coating, if need be, etc. prior to brazing may be performed as conventional. In this case, even if a flux, for example cesium type flux, may be used, the brazing is possible within the temperature range of the invention.

Besides, in the invention, the processes after heating are not restricted particularly. Namely, as performed so far, such processes as using treatment, flux removal and painting may be carried out.

For the production of fin of the invention, an ingot is produced by semicontinuous casting. Then, it is producible through the processes of hot rolling (ply rolling) and cold rolling-annealing, or it is also producible through the processes of continuous casting rolling and cold rolling-annealing.

In following, the invention will be illustrated concretely based on the examples.

EXAMPLE 1

Using the inventive aluminum alloy brazing sheets with three layer structure of brazing material, core material and sacrificial material used as the flat tube and the header for radiator etc., tests were conducted as follows:

Combining the core materials, brazing materials and sacrificial materials with alloy compositions shown in Tables 3 through 9, 0.25 mm thick brazing sheets with three-layer structure were fabricated by usual method. The cladding rates are 10% for brazing material and 15% for sacrificial material. Besides, in the sacrificial materials, Fe and Si are contained in a range of 0.01 to 0.2 wt. %, respectively, as impurity elements.

These brazing sheets were heated in $N_2$ gas under the temperature conditions shown in Tables 10 through 12. With the brazing sheets after heating, the tensile test and the external corrosion resistance test and internal corrosion resistance test directing the brazing material portion to outside and the sacrificial material portion to inside were conducted.

For the external corrosion resistance test, only the central portion of the surface of brazing material was exposed and other faces were all sealed, then the CASS test (JIS H8681) was conducted for 360 hours to examine the situation of generation of pitting corrosion.

For the internal corrosion resistance test, the brazing sheet with the brazing material portion masked was dipped into tap water added with 10 ppm of $Cu^{2+}$ ions for 5 months and a cycle corrosion test of 80° C.×8 hr and room temperature× 16 hr was conducted. Then, the depth of pitting corrosion generated on the surface of sacrificial material was determined by the focal depth method under optical microscope.

These results are shown in Tables 10 through 12.

TABLE 3

| No. of brazing sheet | Composition of brazing material alloy wt. % | | | | | | | Composition of core material alloy wt. % | | | | | | | | | | Composition of sacrificial material alloy wt. % | | | | | |
|---|---|---|---|---|---|---|---|---|---|---|---|---|---|---|---|---|---|---|---|---|---|---|---|
| | Si | Fe | Cu | Zn | In | Sn | Al | Si | Cu | Mn | Mg | Cr | Zr | Ti | Ni | Fe | Al | Zn | In | Sn | Mg | Mn | Al |
| Inventive example | | | | | | | | | | | | | | | | | | | | | | | |
| 1 | 11.0 | 0.3 | 2.0 | 4.0 | — | — | Bal. | 1.3 | 0.7 | 0.9 | — | — | — | 0.05 | — | 0.3 | Bal. | 4.0 | — | — | 2.0 | — | Bal. |
| 2 | " | " | " | " | — | — | " | " | 1.4 | 1.1 | — | — | — | — | — | " | " | " | — | — | " | — | " |
| 3 | " | " | " | " | — | — | " | " | 1.5 | " | 1.15 | — | — | — | — | " | " | " | — | — | " | — | " |
| 4 | " | " | " | " | — | — | " | " | 1.2 | " | — | 1.10 | — | — | — | " | " | " | — | — | " | — | " |
| 5 | " | " | " | " | — | — | " | " | 1.3 | " | — | — | 1.15 | — | — | " | " | " | — | — | " | — | " |
| 6 | " | 0.2 | 1.2 | 1.5 | — | — | " | " | 1.4 | " | — | — | — | 1.8 | — | " | " | " | — | — | " | — | " |
| 7 | " | " | " | " | — | — | " | " | " | " | — | — | — | " | — | " | " | " | — | — | — | — | " |
| 8 | " | " | " | " | — | — | " | " | " | " | — | — | — | " | — | " | " | 3.0 | 0.01 | — | 1.0 | 0.5 | " |
| 9 | 11.5 | 0.5 | 0.7 | 2.5 | — | — | " | " | " | " | — | — | — | " | — | " | " | 4.0 | — | — | 2.0 | — | " |
| 10 | 11.0 | 0.1 | 1.5 | 4.5 | — | — | " | " | " | " | — | — | — | " | — | " | " | " | — | — | " | — | " |
| 11 | " | " | " | " | — | — | " | " | " | " | — | — | — | " | — | " | " | " | — | — | — | — | " |
| 12 | " | " | " | " | — | — | " | " | " | " | — | — | — | " | — | " | " | 3.0 | 0.01 | — | 1.0 | 0.5 | " |
| 13 | 10.5 | 0.3 | 3.0 | 1.0 | — | — | " | " | " | " | — | — | — | " | — | " | " | 4.0 | — | — | 2.0 | — | " |
| 14 | 11.0 | 0.5 | 2.5 | 2.5 | — | — | " | " | " | " | — | — | — | " | — | " | " | " | — | — | " | " | " |
| 15 | 10.0 | 0.3 | 3.0 | 4.0 | — | — | " | " | " | " | — | — | — | " | — | " | " | " | — | — | " | " | " |
| 16 | " | " | " | " | — | — | " | " | " | " | — | — | — | " | — | " | " | " | — | — | — | — | " |
| 17 | " | " | " | " | — | — | " | " | " | " | — | — | — | " | — | " | " | 3.0 | 0.01 | — | 1.0 | 0.5 | " |
| 18 | 11.0 | 0.2 | 6.0 | " | — | — | " | " | " | " | — | — | — | " | — | " | " | 4.0 | — | — | 2.0 | — | " |
| 19 | 9.0 | " | 3.0 | 2.0 | — | — | " | " | " | " | — | — | — | " | — | " | " | " | — | — | " | — | " |
| 20 | " | " | " | 4.0 | — | — | " | " | " | " | — | — | — | " | — | " | " | " | — | — | " | — | " |
| 21 | 11.0 | " | 2.5 | — | — | 0.05 | " | " | " | " | — | — | — | " | — | " | " | " | — | — | " | — | " |
| 22 | " | " | " | 1.0 | — | 0.02 | " | " | " | " | — | — | — | " | — | " | " | " | — | — | " | — | " |

TABLE 4

| No. of brazing sheet | Composition of brazing material alloy wt. % | | | | | | | Composition of core material alloy wt. % | | | | | | | | | | Composition of sacrificial material alloy wt. % | | | | | |
|---|---|---|---|---|---|---|---|---|---|---|---|---|---|---|---|---|---|---|---|---|---|---|---|
| | Si | Fe | Cu | Zn | In | Sn | Al | Si | Cu | Mn | Mg | Cr | Zr | Ti | Ni | Fe | Al | Zn | In | Sn | Mg | Mn | Al |
| Inventive example | | | | | | | | | | | | | | | | | | | | | | | |
| 23 | 11.0 | 0.2 | 1.0 | 1.0 | 0.03 | — | Bal. | 1.3 | 1.4 | 1.1 | — | — | — | 0.18 | — | 0.3 | Bal. | 4.0 | — | — | 2.0 | — | Bal. |
| 24 | " | " | 3.0 | — | 0.05 | — | " | " | " | " | — | — | — | " | — | " | " | " | — | — | " | — | " |
| 25 | " | " | 2.5 | 2.5 | 0.01 | — | " | " | " | " | — | — | — | " | — | " | " | " | — | — | " | — | " |
| 26 | " | " | " | " | " | — | " | " | " | " | — | — | — | " | — | " | " | " | — | — | — | — | " |
| 27 | " | " | " | " | " | — | " | " | " | " | — | — | — | " | — | " | " | 3.0 | 0.01 | — | 1.0 | 0.5 | " |
| 28 | " | " | 1.2 | 4.0 | 4 " | — | " | " | " | " | — | — | — | " | — | " | " | — | — | 0.09 | 1.5 | — | " |
| 29 | " | " | " | " | " | — | " | " | " | " | — | — | — | " | — | " | " | — | 0.02 | 0.01 | 2.0 | — | " |
| 30 | " | " | " | " | " | — | " | " | " | " | — | — | — | " | — | " | " | — | 0.08 | — | " | — | " |
| 31 | " | " | " | " | " | — | " | " | " | " | — | — | — | " | — | " | " | 1.5 | — | — | " | — | " |
| 32 | " | " | " | " | " | — | " | " | " | " | — | — | — | " | — | " | " | 0.8 | 0.02 | — | " | — | " |
| 33 | " | " | 2.5 | 4.0 | " | — | " | " | " | " | — | — | — | " | — | " | " | 3.0 | — | — | " | — | " |
| 34 | " | " | " | " | " | — | " | " | " | " | — | — | — | " | — | " | " | 0.8 | 0.01 | — | — | — | " |
| 35 | " | " | " | " | " | — | " | " | " | " | — | — | — | " | — | " | " | 2.5 | 0.02 | 0.01 | — | — | " |
| 36 | " | " | " | " | " | — | " | " | " | " | — | — | — | " | — | " | " | 1.0 | " | — | — | 0.4 | " |
| 37 | " | " | " | " | " | — | " | " | " | " | — | — | — | " | — | " | " | 3.0 | — | — | — | 1.1 | " |
| 38 | " | " | " | " | " | — | " | " | " | " | — | — | — | " | — | " | " | " | 0.02 | — | 0.2 | — | " |
| 39 | " | " | " | " | " | — | " | " | " | " | — | — | — | " | — | " | " | 4.5 | — | — | 0.5 | — | " |
| 40 | " | " | " | " | " | — | " | " | " | " | — | — | — | " | — | " | " | 5.0 | — | — | 1.5 | 0.8 | " |
| 41 | " | 0.3 | 2.0 | " | — | — | " | 1.1 | 1.5 | 1.2 | — | — | — | — | 0.5 | 0.1 | " | 4.0 | — | — | 2.0 | — | " |
| 42 | " | " | " | " | — | — | " | 1.3 | " | 1.1 | 0.10 | — | — | 0.05 | — | 0.2 | " | " | — | — | " | — | " |
| 43 | " | " | " | " | — | — | " | " | " | " | — | 0.15 | — | 0.03 | — | 0.3 | " | " | — | — | " | — | " |
| 44 | " | " | " | " | — | — | " | " | 1.3 | " | — | — | 0.10 | 0.11 | — | " | " | " | — | — | " | — | " |

TABLE 5

| No. of brazing sheet | Composition of brazing material alloy wt. % | | | | | | | Composition of core material alloy wt. % | | | | | | | | | | Composition of sacrificial material alloy wt. % | | | | | |
|---|---|---|---|---|---|---|---|---|---|---|---|---|---|---|---|---|---|---|---|---|---|---|---|
| | Si | Fe | Cu | Zn | In | Sn | Al | Si | Cu | Mn | Mg | Cr | Zr | Ti | Ni | Fe | Al | Zn | In | Sn | Mg | Mn | Al |
| Inventive example | | | | | | | | | | | | | | | | | | | | | | | |
| 45 | 11.0 | 0.3 | 2.0 | 4.0 | — | — | Bal. | 1.5 | 1.5 | 1.1 | 0.15 | — | 0.15 | — | — | 0.2 | Bal. | 4.0 | — | — | 2.0 | — | Bal. |
| 46 | " | " | " | " | — | — | " | " | 1.2 | 1.3 | 0.20 | — | " | 0.15 | — | 0.3 | " | " | — | — | " | — | " |
| 47 | " | " | " | " | — | — | " | " | 1.3 | 1.4 | " | 0.10 | 0.10 | 0.01 | 0.10 | 0.2 | " | " | — | — | " | — | " |
| 48 | " | " | " | " | — | — | " | 1.3 | 0.9 | 1.0 | — | — | — | 0.15 | — | 0.9 | " | " | — | — | " | — | " |
| 49 | " | " | " | " | — | — | " | " | — | 0.3 | — | — | — | " | — | 0.3 | " | 1.0 | — | — | " | — | " |
| 50 | " | " | " | " | — | — | " | " | 0.8 | 0.5 | — | — | — | 0.05 | — | " | " | 2.0 | — | — | " | — | " |
| 51 | " | " | " | " | — | — | " | 1.4 | " | 0.6 | — | — | — | — | — | 0.5 | " | 4.0 | — | — | " | — | " |
| 52 | " | " | " | " | — | — | " | 1.3 | " | 0.5 | 0.20 | — | — | — | — | 0.3 | " | " | — | — | " | — | " |
| 53 | " | " | " | " | — | — | " | " | " | 0.3 | — | 0.08 | — | — | — | 0.8 | " | " | — | — | " | — | " |
| 54 | " | " | " | " | — | — | " | " | " | " | — | — | 0.15 | — | — | 0.5 | " | " | — | — | " | — | " |
| 55 | " | 0.2 | 1.2 | 1.5 | — | — | " | 1.4 | " | 0.4 | — | — | — | 0.10 | — | 0.4 | " | " | — | — | " | — | " |
| 56 | " | " | " | " | — | — | " | " | " | " | — | — | — | " | — | " | " | " | — | — | " | — | " |
| 57 | " | " | " | " | — | — | " | " | " | " | — | — | — | " | — | " | " | 3.0 | 0.01 | — | 1.0 | 0.5 | " |
| 58 | " | 0.1 | 1.5 | 4.5 | — | — | " | " | " | " | — | — | — | " | — | " | " | 4.0 | — | — | 2.0 | — | " |
| 59 | " | " | " | " | — | — | " | " | " | " | — | — | — | " | — | " | " | " | — | — | " | — | " |
| 60 | " | " | " | " | — | — | " | " | " | " | — | — | — | " | — | " | " | " | — | — | 1.0 | 0.5 | " |
| 61 | 10.0 | 0.3 | 3.0 | 4.0 | — | — | " | " | " | " | — | — | — | " | — | " | " | 4.0 | — | — | 2.0 | — | " |
| 62 | " | " | " | " | — | — | " | " | " | " | — | — | — | " | — | " | " | " | — | — | " | — | " |
| 63 | " | " | " | " | — | — | " | " | " | " | — | — | — | " | — | " | " | 3.0 | 0.01 | — | 1.0 | 0.5 | " |
| 64 | 11.0 | 0.2 | 2.5 | 2.5 | 0.01 | — | " | " | " | " | — | — | — | " | — | " | " | 4.0 | — | — | 2.0 | — | " |
| 65 | " | " | " | " | " | — | " | " | " | " | — | — | — | " | — | " | " | " | — | — | " | — | " |
| 66 | " | " | " | " | " | — | " | " | " | " | — | — | — | 0.01 | — | " | " | 3.0 | 0.01 | — | 1.0 | 0.5 | " |

TABLE 6

| No. of brazing sheet | Composition of brazing material alloy wt. % | | | | | | | Composition of core material alloy wt. % | | | | | | | | | | Composition of sacrificial material alloy wt. % | | | | | |
|---|---|---|---|---|---|---|---|---|---|---|---|---|---|---|---|---|---|---|---|---|---|---|---|
| | Si | Fe | Cu | Zn | In | Sn | Al | Si | Cu | Mn | Mg | Cr | Zr | Ti | Ni | Fe | Al | Zn | In | Sn | Mg | Mn | Al |
| Inventive example | | | | | | | | | | | | | | | | | | | | | | | |
| 67 | 11.0 | 0.3 | 2.0 | 4.0 | — | — | Bal. | 1.5 | 0.8 | 0.3 | — | — | — | — | 0.4 | 0.2 | Bal. | 4.0 | — | — | 2.0 | — | Bal. |
| 68 | " | " | " | " | — | — | " | 1.8 | 1.5 | 0.4 | — | — | — | 0.05 | — | 0.6 | " | " | — | — | " | — | " |
| 69 | " | " | " | " | — | — | " | 1.9 | 0.8 | 1.3 | — | — | — | — | — | 0.5 | " | " | — | — | " | — | " |
| 70 | " | " | " | " | — | — | " | 1.8 | " | 1.1 | — | — | — | 0.15 | — | " | " | " | — | — | " | — | " |
| 71 | " | " | " | " | — | — | " | " | " | " | 0.15 | — | — | " | — | " | " | " | — | — | " | — | " |
| 72 | " | " | " | " | — | — | " | " | 1.5 | 1.2 | — | — | — | 0.10 | — | " | " | " | — | — | " | — | " |
| 73 | " | " | " | " | — | — | " | 0.8 | 0.7 | 0.9 | — | — | — | 0.05 | — | 0.3 | " | " | — | — | " | — | " |
| 74 | " | " | " | " | — | — | " | 1.0 | 1.3 | 1.1 | — | — | — | — | — | " | " | " | — | — | " | — | " |
| 75 | " | " | " | " | — | — | " | " | 1.2 | " | 0.15 | — | — | — | — | " | " | " | — | — | " | — | " |
| 76 | " | " | " | " | — | — | " | 0.8 | " | " | — | 0.10 | — | — | — | " | " | " | — | — | " | — | " |
| 77 | " | " | " | " | — | — | " | 1.0 | 1.5 | " | — | — | 0.15 | — | — | " | " | " | — | — | " | — | " |
| 78 | " | 0.2 | 1.2 | 1.5 | — | — | " | 0.8 | 1.3 | " | — | — | — | 0.18 | — | " | " | 2.0 | — | — | — | — | " |
| 79 | 11.5 | 0.5 | 0.7 | 2.5 | — | — | " | " | " | " | — | — | — | " | — | " | " | 4.0 | — | — | 2.0 | — | " |
| 80 | 11.0 | 0.1 | 1.5 | 4.5 | — | — | " | " | " | " | — | — | — | " | — | " | " | " | — | — | " | — | " |
| 81 | 10.5 | 0.3 | 3.0 | 1.0 | — | — | " | " | " | " | — | — | — | " | — | " | " | " | — | — | " | — | " |
| 82 | 11.0 | 0.5 | 2.5 | 2.5 | — | — | " | " | " | " | — | — | — | " | — | " | " | " | — | — | " | — | " |
| 83 | 10.0 | 0.3 | 3.0 | 4.0 | — | — | " | " | " | " | — | — | — | " | — | " | " | " | — | — | " | — | " |
| 84 | 11.0 | 0.2 | 6.0 | " | — | — | " | " | " | " | — | — | — | " | — | " | " | " | — | — | " | — | " |
| 85 | 9.0 | " | 3.0 | 2.0 | — | — | " | " | " | " | — | — | — | " | — | " | " | " | — | — | " | — | " |
| 86 | " | " | " | 4.0 | — | — | " | " | " | " | — | — | — | " | — | " | " | " | — | — | " | — | " |
| 87 | 11.0 | " | 2.5 | — | — | 0.05 | " | " | " | " | — | — | — | " | — | " | " | " | — | — | " | — | " |
| 88 | " | " | " | 1.0 | — | 0.02 | " | " | " | " | — | — | — | " | — | " | " | " | — | — | " | — | " |

TABLE 7

| No. of brazing sheet | Composition of brazing material alloy wt. % | | | | | | | Composition of Core material alloy wt. % | | | | | | | | | | Composition of sacrificial material alloy wt. % | | | | | |
|---|---|---|---|---|---|---|---|---|---|---|---|---|---|---|---|---|---|---|---|---|---|---|---|
| | Si | Fe | Cu | Zn | In | Sn | Al | Si | Cu | Mn | Mg | Cr | Zr | Ti | Ni | Fe | Al | Zn | In | Sn | Mg | Mn | Al |
| Inventive example | | | | | | | | | | | | | | | | | | | | | | | |
| 89 | 11.0 | 0.2 | 1.0 | 1.0 | 0.03 | — | Bal. | 0.8 | 1.3 | 1.1 | — | — | — | 0.18 | — | 0.3 | Bal. | 4.0 | — | — | 2.0 | — | Bal. |
| 90 | " | " | 3.0 | — | 0.05 | — | " | " | " | " | — | — | — | " | — | " | " | " | — | — | " | — | " |
| 91 | " | " | 2.5 | 2.5 | 0.01 | — | " | " | " | " | — | — | — | " | — | " | " | 2.0 | — | — | " | — | " |
| 92 | " | " | " | " | " | — | " | " | " | " | — | — | — | " | — | " | " | 4.0 | — | — | — | — | " |
| 93 | " | " | " | " | " | — | " | " | " | " | — | — | — | " | — | " | " | 3.0 | 0.01 | — | 1.0 | 0.5 | " |
| 94 | " | " | 1.2 | 4.0 | — | — | " | " | " | " | — | — | — | " | — | " | " | — | — | 0.09 | 1.5 | — | " |
| 95 | " | " | " | " | — | — | " | " | " | " | — | — | — | " | — | " | " | — | 0.02 | 0.01 | 2.0 | — | " |
| 96 | " | " | " | " | — | — | " | " | " | " | — | — | — | " | — | " | " | — | 0.08 | — | " | — | " |
| 97 | " | " | " | " | — | — | " | " | " | " | — | — | — | " | — | " | " | 1.5 | — | — | " | — | " |
| 98 | " | " | " | " | — | — | " | " | " | " | — | — | — | " | — | " | " | 0.8 | 0.02 | — | " | — | " |
| 99 | " | " | 2.5 | " | — | — | " | " | " | " | — | — | — | " | — | " | " | 3.0 | — | — | " | — | " |
| 100 | " | " | " | " | — | — | " | " | " | " | — | — | — | " | — | " | " | 0.8 | 0.01 | — | — | — | " |
| 101 | " | " | " | " | — | — | " | " | " | " | — | — | — | " | — | " | " | 2.5 | 0.02 | 0.01 | — | — | " |
| 102 | " | " | " | " | — | — | " | " | " | " | — | — | — | " | — | " | " | 1.0 | " | — | — | 0.4 | " |
| 103 | " | " | " | " | — | — | " | " | " | " | — | — | — | " | — | " | " | 3.0 | — | — | — | 1.1 | " |
| 104 | " | " | " | " | — | — | " | " | " | " | — | — | — | " | — | " | " | " | 0.02 | — | 2.0 | — | " |
| 105 | " | " | " | " | — | — | " | " | " | " | — | — | — | " | — | " | " | 4.5 | — | — | 0.5 | — | " |
| 106 | " | " | " | " | — | — | " | " | " | " | — | — | — | " | — | " | " | 5.0 | — | — | 1.5 | 0.8 | " |
| 107 | " | 0.3 | 2.0 | " | — | — | " | 1.1 | 1.5 | 1.2 | — | — | — | — | 0.5 | 0.1 | " | 4.0 | — | — | 2.0 | — | " |
| 108 | " | " | " | " | — | — | " | 0.7 | " | 1.1 | 0.10 | — | — | 0.05 | — | 0.2 | " | " | — | — | " | — | " |
| 109 | " | " | " | " | — | — | " | 0.9 | " | " | — | 0.15 | — | 0.02 | — | 0.3 | " | " | — | — | " | — | " |
| 110 | " | " | " | " | — | — | " | " | 1.3 | " | — | — | 0.10 | 0.10 | — | " | " | " | — | — | " | — | " |

TABLE 8

| No. of brazing sheet | Composition of brazing material alloy wt. % | | | | | | | Composition of Core material alloy wt. % | | | | | | | | | | Composition of sacrificial material alloy wt. % | | | | | |
|---|---|---|---|---|---|---|---|---|---|---|---|---|---|---|---|---|---|---|---|---|---|---|---|
| | Si | Fe | Cu | Zn | In | Sn | Al | Si | Cu | Mn | Mg | Cr | Zr | Ti | Ni | Fe | Al | Zn | In | Sn | Mg | Mn | Al |
| Inventive example | | | | | | | | | | | | | | | | | | | | | | | |
| 111 | 11.0 | 0.3 | 2.0 | 4.0 | — | — | Bal. | 0.9 | 1.5 | 1.1 | 0.15 | — | 0.15 | — | — | 0.2 | Bal. | 4.0 | — | — | 2.0 | — | Bal. |
| 112 | " | " | " | " | — | — | " | 0.8 | 1.2 | 1.3 | 0.20 | — | " | 0.15 | — | 0.3 | " | " | — | — | " | — | " |
| 113 | " | " | " | " | — | — | " | 0.7 | 1.3 | 1.4 | " | 0.10 | 0.10 | 0.01 | 0.10 | 0.2 | " | " | — | — | " | — | " |
| 114 | " | " | " | " | — | — | " | " | 0.6 | 0.8 | — | — | — | 0.03 | — | 0.8 | " | " | — | — | " | — | " |
| 115 | " | " | " | " | — | — | " | 0.8 | 1.2 | 1.0 | — | — | — | 0.15 | — | 0.9 | " | 1.0 | — | — | " | — | " |
| 116 | " | " | " | " | — | — | " | 0.9 | 0.8 | 0.6 | — | — | — | — | — | 0.5 | " | 4.0 | — | — | " | — | " |
| 117 | " | " | " | " | — | — | " | " | 0.7 | 0.5 | 0.20 | — | — | — | — | 0.3 | " | " | — | — | " | — | " |
| 118 | " | " | " | " | — | — | " | " | 0.8 | 0.3 | — | — | 0.15 | — | — | 0.5 | " | " | — | — | " | — | " |
| 119 | " | 0.2 | 1.2 | 1.5 | — | — | " | " | " | 0.4 | — | — | — | 0.10 | — | 0.4 | " | " | — | — | " | — | " |
| 120 | " | " | " | " | — | — | " | " | " | " | — | — | — | " | — | " | " | " | — | — | — | — | " |
| 121 | " | " | " | " | — | — | " | " | " | " | — | — | — | " | — | " | " | 3.0 | 0.01 | — | 1.0 | 0.5 | " |
| 122 | " | 0.1 | 1.5 | 4.5 | — | — | " | " | " | " | — | — | — | " | — | " | " | 4.0 | — | — | 2.0 | — | " |
| 123 | " | " | " | " | — | — | " | " | " | " | — | — | — | " | — | " | " | 3.0 | 0.01 | — | 1.0 | 0.5 | " |
| 124 | 10.0 | 0.3 | 3.0 | 4.0 | — | — | " | " | " | " | — | — | — | " | — | " | " | 4.0 | — | — | 2.0 | — | " |
| 125 | 11.0 | 0.2 | 2.5 | 2.5 | 0.01 | — | " | " | " | " | — | — | — | " | — | " | " | " | — | — | " | — | " |
| 126 | " | 0.3 | 2.0 | 4.0 | — | — | " | 0.8 | " | 0.3 | — | — | — | — | 0.4 | 0.2 | " | " | — | — | " | — | " |
| 127 | " | " | " | " | — | — | " | 0.7 | 1.5 | 0.4 | — | — | — | 0.05 | — | 0.6 | " | " | — | — | " | — | " |
| 128 | " | " | " | " | — | — | " | 1.1 | 1.8 | 0.5 | — | — | — | 0.10 | — | 0.5 | " | " | — | — | " | — | " |
| 129 | 11.5 | 0.4 | 0.7 | 2.5 | — | — | " | 1.3 | 1.4 | 1.1 | — | — | — | 0.18 | — | 0.3 | " | " | — | — | — | — | " |
| 130 | 11.0 | " | 2.5 | " | — | — | " | " | " | " | — | — | — | " | — | " | " | " | — | — | — | — | " |
| 131 | " | 0.2 | " | — | — | 0.05 | " | " | " | " | — | — | — | " | — | " | " | " | — | — | — | — | " |
| 132 | " | " | " | 1.0 | — | 0.02 | " | " | " | " | — | — | — | " | — | " | " | 3.0 | 0.01 | — | 1.0 | 0.5 | " |

TABLE 9

| No. of brazing sheet | Composition of brazing material alloy wt. % | | | | | | | Composition of core material alloy wt. % | | | | | | | | | | Composition of sacrificial material alloy wt. % | | | | | |
|---|---|---|---|---|---|---|---|---|---|---|---|---|---|---|---|---|---|---|---|---|---|---|---|
| | Si | Fe | Cu | Zn | In | Sn | Al | Si | Cu | Mn | Mg | Cr | Zr | Ti | Ni | Fe | Al | Zn | In | Sn | Mg | Mn | Al |
| Comparative example | | | | | | | | | | | | | | | | | | | | | | | |
| 133 | 11.0 | 0.3 | 2.0 | 4.0 | — | — | Bal. | 3.0 | 3.0 | 1.1 | — | — | — | — | — | 0.4 | Bal. | 4.0 | — | — | 2.0 | — | Bal. |
| 134 | " | " | " | " | — | — | " | 0.8 | 1.4 | " | — | — | — | 0.10 | — | " | " | 6.5 | — | — | 3.0 | — | " |
| 135 | " | 0.6 | 4.0 | — | — | — | " | " | 1.3 | " | — | — | — | 0.18 | — | 0.3 | " | 4.0 | — | — | 2.0 | — | " |
| 136 | 6.0 | 0.5 | 2.0 | 0.02 | — | — | " | " | " | " | — | — | — | " | — | " | " | " | — | — | " | — | " |
| 137 | 9.8 | 0.7 | 0.05 | — | — | — | " | " | " | " | — | — | — | " | — | " | " | " | — | — | " | — | " |
| 138 | 12.0 | 0.3 | 9.0 | 8.0 | — | — | " | " | " | " | — | — | — | " | — | " | " | " | — | — | " | — | " |
| 139 | 11.0 | " | 2.0 | 4.0 | — | — | " | 3.0 | — | " | — | — | — | — | — | 0.4 | " | " | — | — | " | — | " |
| 140 | " | " | " | " | — | — | " | 1.1 | 3.0 | " | — | — | — | 0.10 | — | " | " | 6.5 | — | — | 3.0 | — | " |
| 141 | " | 0.6 | 4.0 | — | — | — | " | 1.3 | 1.4 | " | — | — | — | 0.18 | — | 0.3 | " | 4.0 | — | — | 2.0 | — | " |
| 142 | 6.0 | 0.5 | 2.0 | 0.02 | — | — | " | " | " | " | — | — | — | " | — | " | " | " | — | — | " | — | " |
| 143 | 9.8 | 0.7 | 0.05 | — | — | — | " | " | " | " | — | — | — | " | — | " | " | " | — | — | " | — | " |
| 144 | 12.0 | 0.3 | 9.0 | 8.0 | — | — | " | " | " | " | — | — | — | " | — | " | " | " | — | — | " | — | " |
| Conventional example | | | | | | | | | | | | | | | | | | | | | | | |
| 145 | 9.8 | 0.7 | — | — | — | — | " | 0.3 | 0.1 | " | — | — | — | 0.01 | — | 0.4 | " | 1.0 | — | — | — | — | " |
| 146 | " | " | — | — | — | — | " | " | 0.5 | " | — | — | — | " | — | " | " | " | — | — | 1.0 | — | " |

TABLE 10

| No. of brazing sheet | Heating condition for brazing °C. (× 5 min.) | Tensile strength MPa | External corrosion resistance Max. depth of pitting corrosion μm | Internal corrosion resistance Max. depth of pitting corrosion μm |
|---|---|---|---|---|
| Inventive example | | | | |
| 1 | 580 | 240 | 80 | 60 |
| 2 | " | 250 | " | 70 |
| 3 | " | " | " | " |
| 4 | " | " | " | " |
| 5 | " | " | " | " |
| 6 | " | " | 70 | " |
| 7 | " | 230 | " | " |
| 8 | " | 240 | " | " |
| 9 | " | 250 | 60 | " |
| 10 | " | " | 100 | " |
| 11 | " | 230 | 80 | " |
| 12 | " | 240 | " | " |
| 13 | " | 250 | 70 | " |
| 14 | " | " | 100 | " |
| 15 | " | " | 80 | " |
| 16 | " | 230 | " | " |
| 17 | " | 240 | " | " |
| 18 | " | 250 | " | " |
| 19 | " | " | " | " |
| 20 | " | " | " | " |
| 21 | " | " | 100 | " |
| 22 | " | " | " | " |
| 23 | " | " | 90 | " |
| 24 | " | " | " | " |
| 25 | " | " | " | " |
| 26 | " | 230 | " | " |
| 27 | " | 240 | " | " |
| 28 | " | " | 70 | 80 |
| 29 | " | " | " | " |
| 30 | " | " | " | 60 |
| 31 | " | " | " | " |
| 32 | " | " | " | 70 |
| 33 | " | 250 | 80 | 60 |
| 34 | " | 220 | " | 80 |
| 35 | " | " | " | 50 |
| 36 | " | " | " | 70 |
| 37 | " | 230 | " | " |
| 38 | " | " | " | " |
| 39 | " | 240 | " | " |
| 40 | " | 250 | " | " |
| 41 | " | " | " | " |
| 42 | " | " | " | " |
| 43 | " | " | " | " |
| 44 | " | " | " | " |
| 45 | " | " | " | " |
| 46 | " | " | " | " |
| 47 | " | " | " | " |
| 48 | " | 230 | " | " |
| 49 | " | 160 | " | " |
| 50 | " | 170 | " | " |
| 51 | " | 190 | " | " |
| 52 | " | 200 | " | " |
| 53 | " | " | " | " |
| 54 | " | " | " | " |
| 55 | " | " | 70 | " |
| 56 | " | 180 | " | " |

TABLE 11

| No. of brazing sheet | Heating condition for brazing °C. (× 5 min.) | Tensil strength MPa | External corrosion resistance Max. depth of pitting corrosion μm | Internal corrosion resistance Max. depth of pitting corrosion μm |
|---|---|---|---|---|
| Inventive example | | | | |
| 57 | 580 | 190 | 70 | 70 |
| 58 | " | 200 | 80 | " |
| 59 | " | 180 | " | " |
| 60 | " | 190 | " | " |
| 61 | " | 200 | 70 | " |
| 62 | " | 180 | " | " |
| 63 | " | 190 | " | " |
| 64 | " | 200 | 80 | " |
| 65 | " | 180 | " | " |
| 66 | " | 190 | " | " |
| 67 | " | 200 | " | " |
| 68 | 575 | 220 | " | " |
| 69 | " | 250 | " | " |
| 70 | " | " | " | " |
| 71 | " | 260 | " | " |
| 72 | " | " | " | " |
| 73 | 580 | 210 | " | " |
| 74 | " | 220 | " | 70 |
| 75 | " | 230 | " | 80 |
| 76 | " | 220 | " | " |
| 77 | " | " | 70 | " |
| 78 | " | 200 | 80 | 90 |
| 79 | " | 220 | " | 70 |
| 80 | " | " | 90 | " |
| 81 | " | " | 80 | " |
| 82 | " | " | 90 | " |
| 83 | " | " | 70 | " |
| 84 | " | " | " | " |
| 85 | " | " | 80 | " |
| 86 | " | " | " | " |
| 87 | " | 200 | 90 | " |
| 88 | " | " | 70 | " |
| 89 | " | " | 90 | " |
| 90 | " | 220 | 80 | " |
| 91 | " | " | " | 80 |
| 92 | " | 200 | " | 70 |
| 93 | " | 220 | " | " |
| 94 | 575 | 210 | " | 80 |
| 95 | " | " | " | 90 |
| 96 | " | " | " | 70 |
| 97 | " | " | " | 80 |
| 98 | " | " | " | " |
| 99 | 580 | 220 | 70 | " |
| 100 | " | 200 | " | 90 |
| 101 | " | " | " | 80 |
| 102 | " | " | " | " |
| 103 | " | " | " | " |
| 104 | " | 210 | " | 70 |
| 105 | " | " | " | " |
| 106 | " | 220 | " | " |
| 107 | " | " | " | " |
| 108 | " | " | " | 80 |
| 109 | " | " | " | 70 |
| 110 | " | " | " | " |
| 111 | " | " | " | 80 |
| 112 | " | " | " | " |

TABLE 12

| No. of brazing sheet | Heating condition for brazing °C. (× 5 min.) | Tensil strength MPa | External corrosion resistance Max. depth of pitting corrosion μm | Internal corrosion resistance Max. depth of pitting corrosion μm |
|---|---|---|---|---|
| Inventive example | | | | |
| 113 | 580 | 220 | 70 | 80 |
| 114 | " | 190 | " | 50 |
| 115 | " | 220 | " | 70 |
| 116 | " | 190 | " | 60 |
| 117 | " | 200 | " | " |
| 118 | " | 190 | " | " |
| 119 | " | " | 90 | " |
| 120 | " | 170 | " | " |
| 121 | " | 180 | " | " |
| 122 | " | 190 | " | 70 |
| 123 | " | 180 | 80 | 60 |
| 124 | " | 190 | 70 | 70 |
| 125 | " | " | " | " |
| 126 | " | 180 | 80 | " |
| 127 | 575 | 200 | 90 | 90 |
| 128 | " | 230 | " | " |
| 129 | 580 | " | 60 | 70 |
| 130 | " | " | 100 | " |
| 131 | " | " | " | " |
| 132 | " | 240 | " | " |
| Comparative example | | | | |
| 133 | 575 | Unmeasurabe due to melting | | |
| 134 | " | Unmeasurabe due to melting | | |
| 135 | 580 | 250 | * | 70 |
| 136 | 600 | Unmeasurabe due to melting | | |
| 137 | " | Unmeasurabe due to melting | | |
| 138 | Unproducibe due to cracking on the way of rolling | | | |
| 139 | 575 | Unmeasurabe due to melting | | |
| 140 | " | Unmeasurabe due to melting | | |
| 141 | 580 | 250 | * | 70 |
| 142 | 600 | Unmeasurabe due to melting | | |
| 143 | " | Unmeasurabe due to melting | | |
| 144 | Unproducibe due to cracking on the way of rolling | | | |
| Conventional example | | | | |
| 145 | 600 | 130 | 120 | 140 |
| 146 | " | 160 | Generation of blistering | * |

*: Generation of piercing pitting corrosion

As evident from Tables 10 through 12, the brazing sheets of the inventive examples show no melting during brazing, have high strength, and are excellent also in the corrosion resistance.

Whereas, in the comparative examples 133, 134, 139 and 140, wherein the core material or the sacrificial material is out of the range of the invention, they ended up to melt despite heating at 575° C. for brazing. In the comparative examples 135 and 141, wherein Zn, In and Sn are not contained in the brazing material, the external corrosion resistance decreased. In the comparative examples 136, 137, 142 and 143, wherein the brazing material is out of the range of the invention, heating was performed at 600° C. because of the brazing material not melting at 585° C. or lower, but the core material ended up to melt. In the comparative examples 138 and 144, wherein Cu and Zn in the brazing material are added more than those within the range of the invention, cracking ended to occur during rolling, making it impossible to produce the brazing sheet.

In the conventional example 145, wherein usual plate thickness of 0.4 mm was thinned, the strength and the corrosion resistance are poor over the brazing sheets of the inventive examples. In the conventional example 146, which is an example containing much Cu in the core material, the corrosion resistance is poor.

EXAMPLE 2

Aluminum alloy fin materials with alloy compositions shown in Table 13 and tube material and header materials with three-layer structure of brazing material, core material and sacrificial material shown in Table 14 were combined as in Table 15 to assemble the radiators shown in FIG. 1. Besides, for the fin materials, 0.06 mm thick bare materials with alloy compositions shown in Table 13 were used, and, for the tube materials, 0.3 mm thick coil-shaped brazing sheets cladded one side of core material with brazing material in a thickness of 10% and other side with sacrificial material in a thickness of 15% were produced by usual method. These coil-shaped brazing sheets were slitted adjusting to the size of seam welded pipe to make 35.0 mm wide strip materials. These strip materials were processed to 16.0 mm wide, 2.2 mm thick seam welded pipes for fluid-passing pipe using production device of seam welded pipe. Moreover, 1.0 mm thick coil-shaped brazing sheets with the same constitution were slitted to a width of 60 mm to make strip materials for the header material.

Onto the radiators assembled, a 10% concentration flux liquor with 3% cesium type flux mixed with potassium fluoride type flux was coated, which was heated in $N_2$ gas under the conditions shown in Table 15 for brazing. The combinations of materials with heating conditions are shown in Table 15.

Of the radiators thus obtained, the collapse state of fin and tube and the formation of fillet were investigated by the observation of external appearance. Moreover, with the radiators brazed exactly, the thermal efficiency was investigated. The thermal efficiency was measured according to JIS D1618 (Test method of air conditioner for automobiles) and expressed respectively as an improvement percentage to the thermal efficiency of conventional radiator.

Moreover, the results of tensile test conducted with the tube materials after heating for brazing were also put down combiningly in Table 15.

TABLE 13

| Fin material | Alloy composition wt. % | | | | | | | |
|---|---|---|---|---|---|---|---|---|
| | Si | Cu | Mn | Zn | Zr | Ti | Fe | Al |
| A | 0.2 | 0.05 | 1.1 | 1.0 | — | 0.01 | 0.5 | Bal. |
| B | 1.10 | — | — | " | 0.15 | " | 0.65 | " |

TABLE 14

| Tube material Header material | Composition of brazing material alloy wt. % | | | | | Composition of core material alloy wt. % | | | | | | | Composition of sacrificial material alloy | | | |
|---|---|---|---|---|---|---|---|---|---|---|---|---|---|---|---|---|
| | Si | Fe | Cu | Zn | Al | Si | Cu | Mn | Mg | Zr | Ti | Fe | Al | Zn | Mg | Al |
| a | 11.0 | 0.4 | 1.5 | 1.5 | Bal. | 0.9 | 1.2 | 1.1 | 0.15 | — | 0.11 | 0.3 | Bal. | 4.0 | 2.0 | Bal. |
| b | " | 0.2 | 2.5 | 4.0 | " | 1.0 | 0.8 | " | — | — | 0.18 | " | " | " | " | " |
| c | " | " | 3.5 | 3.5 | " | 0.8 | 1.5 | 0.3 | 0.15 | — | 0.11 | " | " | " | — | " |
| d | 9.8 | 0.6 | — | — | " | 0.3 | 0.15 | 1.1 | — | — | 0.01 | 0.5 | " | 1.0 | — | " |
| e | " | " | — | — | " | 0.8 | 0.5 | " | 0.15 | 0.15 | 0.10 | " | " | 4.0 | 2.0 | " |

TABLE 15

| | Combination | | | | | | Tensile strength of |
|---|---|---|---|---|---|---|---|
| No. | Fin mterial | Tube material Header material | Heating temp. for °C. (× 5 min.) | Location of collapse generation | Brazability | Thermal efficiency | tube after healing for brazing MPa |
| Inventive method | | | | | | | |
| 1 | A | a | 580 | None | Good | 0.5% More increase than 7 | 220 |
| 2 | B | " | " | " | " | 2.5% More increase than 7 | " |
| 3 | A | b | " | " | " | 0.5% More increase than 7 | 200 |
| 4 | B | " | " | " | " | 2.5% More increase than 7 | " |
| 5 | A | c | " | " | " | 0.5% More increase than 7 | 220 |
| 6 | B | " | " | " | " | 2.5% More increase than 7 | " |
| Conventional method | | | | | | | |
| 7 | A | d | 600 | " | " | Standard | 130 |
| Comparative method | | | | | | | |
| 8 | " | " | " | Fin | " | 2.0% More decrease than 7 | " |
| 9 | A | e | " | Tube | " | Unmeasurable | — |

\* With a tube 9measurement of thermal efficiency and tensile test could not be carried out because of melting by heating for brazing.

Moreover, aluminum alloy fins shown in Table 13 and tube materials and header materials with three-layer structure shown in Table 16 were combined to assemble the radiators shown in FIG. 1. Besides, the constitution of these fin materials, tube materials and header materials was made to be same as above.

And, onto the radiators assembled, the flux was coated similarly to above, which was heated in $N_2$ gas under the conditions shown in Table 17. Then, the observation of external appearance and the measurement of thermal efficiency were conducted and the results are put down in Table 17. Also, the results of tensile test of tube materials after heating for brazing are put down in Table 17.

TABLE 16

| Tube material Header material | Composition of brazing material alloy wt. % | | | | | Composition of core material alloy wt. % | | | | | | | Composition of sacrificial material alloy | | | |
|---|---|---|---|---|---|---|---|---|---|---|---|---|---|---|---|---|
| | Si | Fe | Cu | Zn | Al | Si | Cu | Mn | Mg | Zr | Ti | Fe | Al | Zn | Mg | Al |
| f | 11.0 | 0.4 | 1.5 | 1.5 | Bal. | 1.4 | 0.8 | 1.1 | 0.15 | — | 0.11 | 0.5 | Bal. | 4.0 | 2.0 | Bal. |
| g | 9.8 | — | — | — | " | 0.3 | 0.15 | " | — | — | 0.01 | " | " | 1.0 | — | " |
| h | " | — | — | — | " | 1.6 | 0.5 | " | 0.15 | 0.15 | 0.10 | " | " | 4.0 | 2.0 | " |

TABLE 17

| | No. | Combination Fin mterial | Combination Tube material Header material | Heating temp. for brazing °C. (× 5 min.) | Location of collapse generation | Brazability | Thermal efficiency | Tensile strength of tube after heating for brazing MPa |
|---|---|---|---|---|---|---|---|---|
| Inventive method | ⑩ | A | f | 580 | None | Good | 0.5% More increase than ⑫ | 240 |
| | ⑪ | B | " | " | " | " | 2.5% More increase than ⑫ | " |
| Conventional method | ⑫ | A | g | 600 | " | " | Standard | 130 |
| Comparative method | ⑬ | B | " | " | Fin | " | 2.0% More decrease than ⑫ | " |
| | ⑭ | A | h | " | Tube | " | Unmeasurable | — |

*With a tube ⑭, measurement of thermal efficiency and tensile test could not be carried out because of melting by heating for brazing.

As evident from Tables 15 and 17, the radiators by the inventive method are being produced without causing the collapse of fin, have high strength after heating, and are excellent also in the thermal efficiency.

EXAMPLE 3

Combining brazing materials and core materials with alloy compositions shown in Tables 18 through 21, 0.4 mm thick brazing sheets were fabricated by usual method. The cladding rate of brazing material is 10% on both sides of brazing sheet.

These brazing sheets were heated in N$_2$ gas under the conditions shown in Tables 22 and 23. With the brazing sheets after heating, the tensile test and the corrosion resistance test were conducted.

For the corrosion resistance test, only the central portion of the surface of brazing material was exposed and other faces were all sealed, then the CASS test (JIS H8681) was conducted for 360 hours to examine the situation of generation of pitting corrosion.

These results are shown in Tables 22 and 23.

TABLE 18

| No. of brazing sheet | Composition of brazing material alloy wt. % | | | | | | | Composition of core material alloy wt. % | | | | | | | | | |
|---|---|---|---|---|---|---|---|---|---|---|---|---|---|---|---|---|---|
| | Si | Cu | Zn | In | Sn | Fe | Al | Si | Cu | Mn | Mg | Cr | Zr | Ti | Ni | Fe | Al |
| Inventive example | | | | | | | | | | | | | | | | | |
| 1 | 11.0 | 2.0 | 4.0 | — | — | 0.3 | Bal. | 1.3 | 0.7 | 0.9 | — | — | — | 0.05 | — | 0.3 | Bal. |
| 2 | " | " | " | — | — | " | " | " | 1.4 | 1.1 | — | — | — | — | — | " | " |
| 3 | " | " | " | — | — | " | " | " | 1.3 | " | — | — | 0.15 | — | — | " | " |
| 4 | " | 1.2 | 1.5 | — | — | 0.2 | " | " | 1.4 | " | — | — | — | 0.18 | — | " | " |
| 5 | 11.5 | 0.7 | 2.5 | — | — | 0.5 | " | " | " | " | — | — | — | " | — | " | " |
| 6 | 11.0 | 1.5 | 4.5 | — | — | 0.2 | " | " | " | " | — | — | — | " | — | " | " |
| 7 | — | 2.5 | 2.5 | — | — | 0.5 | " | " | " | " | — | — | — | " | — | " | " |
| 8 | 10.0 | 3.0 | 4.0 | — | — | 0.3 | " | " | " | " | — | — | — | " | — | " | " |
| 9 | 11.0 | 6.0 | " | — | — | 0.2 | " | " | " | " | — | — | — | " | — | " | " |
| 10 | 9.0 | 3.0 | " | — | — | " | " | " | " | " | — | — | — | " | — | " | " |
| 11 | 11.0 | 2.5 | — | — | 0.05 | " | " | " | " | " | — | — | — | " | — | " | " |
| 12 | " | " | 1.0 | — | 0.02 | " | " | " | " | " | — | — | — | " | — | " | " |
| 13 | " | 3.0 | — | 0.05 | — | " | " | " | " | " | — | — | — | " | — | " | " |
| 14 | " | 2.5 | 2.5 | 0.01 | — | " | " | " | " | " | — | — | — | " | — | " | " |
| 15 | " | 2.0 | 4.0 | — | — | 0.3 | " | " | 1.5 | " | 0.10 | — | — | 0.05 | — | 0.2 | " |
| 16 | " | " | " | — | — | " | " | " | 1.3 | " | — | — | 0.10 | 0.11 | — | 0.3 | — |
| 17 | " | " | " | — | — | " | " | 1.5 | " | 1.4 | 0.20 | 0.10 | " | 0.01 | 0.10 | 0.2 | " |
| 18 | " | " | " | — | — | " | " | 1.3 | 0.9 | 1.0 | — | — | — | 0.15 | — | 0.9 | " |
| 19 | " | " | " | — | — | " | " | 1.4 | 0.8 | 0.6 | — | — | — | — | — | 0.5 | " |
| 20 | " | " | " | — | — | " | " | 1.4 | " | 0.5 | 0.20 | — | — | — | — | 0.3 | " |
| 21 | " | " | " | — | — | " | " | " | " | 0.3 | — | — | 0.15 | — | — | 0.5 | " |

TABLE 19

| No. of brazing sheet | Composition of brazing material alloy wt. % | | | | | | | Composition of core material alloy wt. % | | | | | | | | | |
|---|---|---|---|---|---|---|---|---|---|---|---|---|---|---|---|---|---|
| | Si | Cu | Zn | In | Sn | Fe | Al | Si | Cu | Mn | Mg | Cr | Zr | Ti | Ni | Fe | Al |
| *Inventive example* | | | | | | | | | | | | | | | | | |
| 22 | 11.0 | 2.5 | 2.5 | 0.01 | — | 0.2 | Bal. | 1.4 | 0.8 | 0.4 | — | — | — | 0.10 | — | 0.4 | Bal. |
| 23 | " | 2.0 | 4.0 | — | — | 0.3 | " | 1.8 | 1.5 | " | — | — | — | 0.05 | — | 0.6 | " |
| 24 | " | " | " | — | — | " | " | 1.9 | 0.8 | 1.3 | — | — | — | — | — | 0.5 | " |
| 25 | " | " | " | — | — | " | " | 1.8 | " | 1.1 | — | — | — | 0.15 | — | " | " |
| 26 | " | " | " | — | — | " | " | " | " | " | 0.15 | — | — | " | — | " | " |
| 27 | " | " | " | — | — | " | " | " | 1.5 | 1.2 | — | — | — | 0.10 | — | " | " |
| 28 | " | " | " | — | — | " | " | 0.8 | 0.7 | 0.9 | — | — | — | 0.05 | — | 0.3 | " |
| 29 | " | " | " | — | — | " | " | 1.0 | 1.3 | 1.1 | — | — | — | — | — | " | " |
| 30 | " | " | " | — | — | " | " | " | 1.2 | " | 0.15 | — | — | — | — | " | " |
| 31 | " | " | " | — | — | " | " | 0.8 | " | " | — | 0.10 | — | — | — | " | " |
| 32 | " | " | " | — | — | " | " | 1.0 | 1.5 | " | — | — | 0.15 | — | — | " | " |
| 33 | " | 1.2 | 1.5 | — | — | 0.2 | " | 0.8 | 1.3 | " | — | — | — | 0.18 | — | " | " |
| 34 | 11.5 | 0.7 | 2.5 | — | — | 0.5 | " | " | " | " | — | — | — | " | — | " | " |
| 35 | 11.0 | 1.5 | 4.5 | — | — | 0.1 | " | " | " | " | — | — | — | " | — | " | " |
| 36 | 10.5 | 3.1 | 1.0 | — | — | 0.3 | " | " | " | " | — | — | — | " | — | " | " |
| 37 | 11.0 | 2.5 | 2.5 | — | — | 0.5 | " | " | " | " | — | — | — | " | — | " | " |
| 38 | 10.0 | 3.0 | 4.0 | — | — | 0.3 | " | " | " | " | — | — | — | " | — | " | " |
| 39 | 11.0 | 6.0 | " | — | — | 0.2 | " | " | " | " | — | — | — | " | — | " | " |
| 40 | 9.0 | 3.0 | 2.0 | — | — | " | " | " | " | " | — | — | — | " | — | " | " |
| 41 | " | " | 4.0 | — | — | " | " | " | " | " | — | — | — | " | — | " | " |
| 42 | 11.0 | 2.5 | — | — | 0.05 | " | " | " | " | " | — | — | — | " | — | " | " |

TABLE 20

| No. of brazing sheet | Composition of brazing material alloy wt. % | | | | | | | Composition of core material alloy wt. % | | | | | | | | | |
|---|---|---|---|---|---|---|---|---|---|---|---|---|---|---|---|---|---|
| | Si | Cu | Zn | In | Sn | Fe | Al | Si | Cu | Mn | Mg | Cr | Zr | Ti | Ni | Fe | Al |
| *Inventive example* | | | | | | | | | | | | | | | | | |
| 43 | 11.0 | 2.5 | 1.0 | — | 0.02 | 0.2 | Bal. | 0.8 | 1.3 | 1.1 | — | — | — | 0.18 | — | 0.3 | Bal. |
| 44 | " | 1.0 | " | 0.03 | — | " | " | " | " | " | — | — | — | " | — | " | " |
| 45 | " | 3.0 | — | 0.05 | — | " | " | " | " | " | — | — | — | " | — | " | " |
| 46 | " | 2.5 | 2.5 | 0.01 | — | " | " | " | " | " | — | — | — | " | — | " | " |
| 47 | " | 2.0 | 4.0 | — | — | 0.3 | " | 1.1 | 1.5 | 1.2 | — | — | — | — | 0.5 | 0.1 | " |
| 48 | " | " | " | — | — | " | " | 0.7 | " | 1.1 | 0.10 | — | — | 0.05 | — | 0.2 | " |
| 49 | " | " | " | — | — | " | " | 0.9 | " | " | — | 0.15 | — | 0.02 | — | 0.3 | " |
| 50 | " | " | " | — | — | " | " | " | 1.3 | " | — | — | 0.10 | 0.10 | — | " | " |
| 51 | " | " | " | — | — | " | " | " | 1.5 | " | 0.15 | — | 0.15 | — | — | 0.2 | " |
| 52 | " | " | " | — | — | " | " | 0.8 | 1.2 | 1.3 | 0.20 | — | " | 0.15 | — | 0.3 | " |
| 53 | " | " | " | — | — | " | " | 0.7 | 1.3 | 1.4 | " | 0.10 | 0.10 | 0.01 | 0.10 | 0.2 | " |
| 54 | " | " | " | — | — | " | " | " | 0.6 | 0.8 | — | — | — | 0.03 | — | 0.8 | " |
| 55 | " | " | " | — | — | " | " | 0.8 | 1.2 | 1.0 | — | — | — | 0.15 | — | 0.9 | " |
| 56 | " | " | " | — | — | " | " | 0.9 | 0.8 | 0.6 | — | — | — | — | — | 0.5 | " |
| 57 | " | " | " | — | — | " | " | " | 0.7 | 0.5 | 0.20 | — | — | — | — | 0.3 | " |
| 58 | " | " | " | — | — | " | " | " | 0.8 | 0.3 | — | 0.08 | — | — | — | 0.8 | " |
| 59 | " | " | " | — | — | " | " | 0.8 | " | " | — | — | 0.15 | — | — | 0.5 | " |
| 60 | " | 1.2 | 1.5 | — | — | 0.2 | " | 0.9 | " | 0.4 | — | — | — | 0.10 | — | 0.4 | " |
| 61 | " | 1.5 | 4.5 | — | — | 0.1 | " | " | " | " | — | — | — | " | — | " | " |
| 62 | 10.0 | 3.0 | 4.0 | — | — | 0.3 | " | " | " | " | — | — | — | " | — | " | " |
| 63 | 11.0 | 2.5 | 2.5 | 0.01 | — | 0.2 | " | " | " | " | — | — | — | " | — | " | " |

TABLE 21

| No. of brazing sheet | Composition of brazing material alloy wt. % | | | | | | | Composition of core material alloy wt. % | | | | | | | | | |
|---|---|---|---|---|---|---|---|---|---|---|---|---|---|---|---|---|---|
| | Si | Cu | Zn | In | Sn | Fe | Al | Si | Cu | Mn | Mg | Cr | Zr | Ti | Ni | Fe | Al |
| Inventive example | | | | | | | | | | | | | | | | | |
| 64 | 11.0 | 2.0 | 4.0 | — | — | 0.3 | Bal. | 0.8 | 0.8 | 0.3 | — | — | — | — | 0.4 | 0.2 | Bal. |
| 65 | " | " | " | — | — | " | " | 0.7 | 1.5 | 0.4 | — | — | — | 0.05 | — | 0.6 | " |
| 66 | " | " | " | — | — | " | " | 1.1 | 1.8 | 0.5 | — | — | — | 0.10 | — | 0.5 | " |
| Comparative example | | | | | | | | | | | | | | | | | |
| 67 | " | " | " | — | — | " | " | 3.0 | 3.0 | 1.1 | — | — | — | — | — | 0.4 | " |
| 68 | " | " | " | — | — | " | " | 0.8 | 3.4 | " | 0.3 | — | — | 0.10 | — | " | " |
| 69 | " | 4.0 | — | — | — | 0.6 | " | " | 1.3 | " | — | — | — | 0.18 | — | 0.3 | " |
| 70 | 6.0 | 2.0 | 0.02 | — | — | 0.5 | " | " | " | " | — | — | — | " | — | " | " |
| 71 | 9.8 | 0.05 | — | — | — | 0.7 | " | " | " | " | — | — | — | " | — | " | " |
| 72 | 12.0 | 9.0 | 8.0 | — | — | 0.3 | " | " | " | " | — | — | — | " | — | " | " |
| 73 | 11.0 | 2.0 | 4.0 | — | — | " | " | 3.0 | — | " | — | — | — | — | — | 0.4 | " |
| 74 | " | " | " | — | — | " | " | 1.1 | 3.0 | " | — | — | — | 0.10 | — | " | " |
| 75 | " | 4.0 | — | — | — | 0.6 | " | 1.3 | 1.4 | " | — | — | — | 0.18 | — | 0.3 | " |
| 76 | 6.0 | 2.0 | 0.02 | — | — | 0.5 | " | " | " | " | — | — | — | " | — | " | " |
| 77 | 9.8 | 0.05 | — | — | — | 0.7 | " | " | " | " | — | — | — | " | — | " | " |
| 78 | 12.0 | 9.0 | 8.0 | — | — | 0.3 | " | " | " | " | — | — | — | " | — | " | " |
| Conventional example | | | | | | | | | | | | | | | | | |
| 79 | 9.8 | — | — | — | — | 0.7 | " | 0.3 | 0.1 | " | — | — | — | 0.01 | — | 0.4 | " |
| 80 | " | — | — | — | — | " | " | " | 0.5 | " | — | — | — | " | — | " | " |

TABLE 22

| No. of brazing Sheet | Heating condition for brazing °C. (× 5 min.) | Tensile strength MPa | Max. depth of pitting corrosion μm |
|---|---|---|---|
| Inventive example | | | |
| 1 | 575 | 210 | 80 |
| 2 | 580 | 220 | " |
| 3 | " | " | " |
| 4 | " | " | 70 |
| 5 | " | " | 60 |
| 6 | " | " | 100 |
| 7 | " | " | " |
| 8 | " | " | 80 |
| 9 | " | " | " |
| 10 | " | " | " |
| 11 | " | " | 100 |
| 12 | " | " | " |
| 13 | " | " | 90 |
| 14 | " | " | " |
| 15 | " | " | 80 |
| 16 | " | " | " |
| 17 | " | " | " |
| 18 | " | 200 | " |
| 19 | " | 170 | " |
| 20 | " | " | " |
| 21 | " | " | " |
| 22 | " | " | " |
| 23 | 575 | 190 | " |
| 24 | " | 220 | " |
| 25 | " | " | " |
| 26 | " | 230 | " |
| 27 | " | " | " |
| 28 | 580 | 180 | " |
| 29 | " | 190 | " |
| 30 | " | 200 | " |
| 31 | " | 190 | 90 |
| 32 | 575 | " | 70 |
| 33 | 580 | 170 | 80 |
| 34 | " | 190 | " |
| 35 | " | " | 90 |
| 36 | " | " | 80 |
| 37 | " | " | 90 |
| 38 | " | " | 70 |
| 39 | " | " | " |
| 40 | " | " | 80 |
| 41 | " | " | " |
| 42 | " | " | 90 |
| 43 | " | " | 70 |
| 44 | " | " | 90 |
| 45 | " | " | 80 |
| 46 | " | " | " |
| 47 | " | " | 70 |
| 48 | " | " | " |
| 49 | " | " | " |
| 50 | " | " | " |
| 51 | " | " | " |
| 52 | " | " | " |
| 53 | " | " | " |
| 54 | " | 160 | " |
| 55 | " | 190 | " |
| 56 | " | 160 | " |

TABLE 23

| No. of brazing Sheet | Heating condition for brazing °C. (× 5 min.) | Tensile strength MPa | Max. depth of pitting corrosion μm |
| --- | --- | --- | --- |
| Inventive example | | | |
| 57 | 580 | 170 | 70 |
| 58 | " | 160 | " |
| 59 | " | " | " |
| 60 | " | " | 90 |
| 61 | " | " | " |
| 62 | " | " | 70 |
| 63 | " | " | " |
| 64 | 575 | " | 80 |
| 65 | " | 170 | 90 |
| 66 | " | 200 | " |
| Comparative example | | | |
| 67 | " | | Unmeasurabe due to melting |
| 68 | " | | Unmeasurabe due to melting |
| 69 | 580 | 220 | Piercing |
| 70 | 600 | | Unmeasurabe due to melting |
| 71 | 600 | | Unmeasurabe due to melting |
| 72 | Unproducibe due to cracking on the way of rolling | | |
| 73 | 575 | | Unmeasurabe due to melting |
| 74 | " | | Unmeasurabe due to melting |
| 75 | 580 | 220 | Piercing |
| 76 | 600 | | Unmeasurabe due to melting |
| 77 | " | | Unmeasurabe due to melting |
| 78 | Unproducibe due to cracking on the way of rolling | | |
| Conventional example | | | |
| 79 | 600 | 130 | 120 |
| 80 | " | 160 | Generation of blistering |

As evident from Tables 22 and 23, the brazing sheets of the inventive examples show no melting during brazing, have high strength, and are excellent also in the corrosion resistance.

Whereas, in the comparative examples 67, 68, 73 and 74, wherein the core material is out of the range of the invention, it ended up to melt despite heating at 575° C. for brazing. In the comparative examples 69 and 75, wherein Zn, In and Sn are not contained in the brazing material, the corrosion resistance decreased. In the comparative examples 70, 71, 76 and 77, wherein the brazing material is out of the range of the invention, heating was performed at 600° C. because of the brazing material not melting at 585° C. or lower, but the core material ended up to melt. In the comparative examples 72 and 78, wherein Cu and Zn in the brazing material are added more than those within the range of the invention, cracking ended to occur during rolling, making it impossible to produce the brazing sheet.

In the conventional example 79, the strength is poor over the brazing sheets of the inventive examples. In the conventional example 80, which is an example containing much Cu, the corrosion resistance is poor.

EXAMPLE 4

Figure 2:
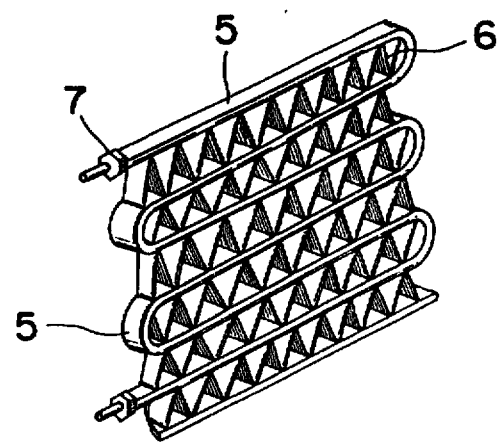
FIG. 2 is an oblique view showing the serpentine type condenser.
Figure 3:
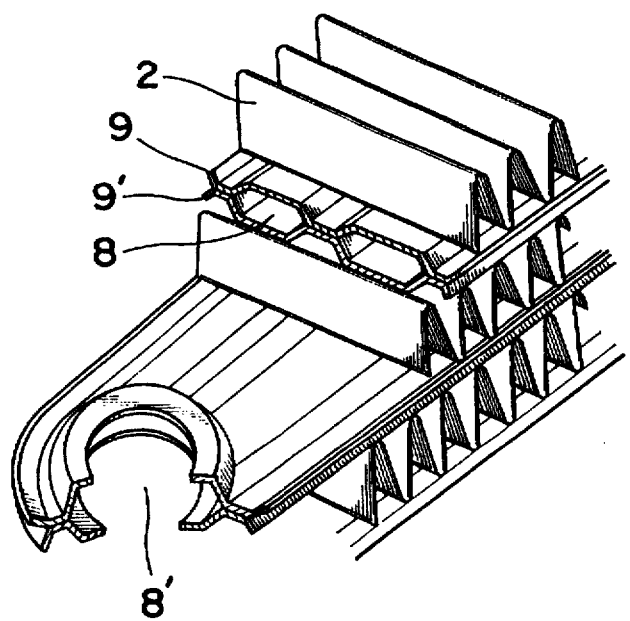
FIG. 3 is a partially sectional oblique view showing the multilayer type evaporator.

Bare fin materials A and B comprising aluminum alloys and plate materials a through c comprising brazing sheets with alloy compositions shown in Table 24 were combined to assemble the multilayer type evaporators shown in FIG. 2. The fin materials are 0.08 mm thick bare materials and the plate materials are 0.35 mm thick brazing sheets cladded both sides of core material with 10% brazing material, respectively.

Onto the heat-exchangers assembled, a 10% concentration flux liquor with 3% cesium type flux mixed with potassium fluoride type flux was coated, which was heated in $N_2$ gas under the conditions shown in Table 25 for brazing. The combinations of materials with heating conditions are shown in Table 25.

Of the heat-exchangers thus obtained, the collapse state of fin and tube and the formation of fillet were investigated by the observation of external appearance. Moreover, with the heat-exchangers brazed exactly, the thermal efficiency was investigated. The thermal efficiency was measured according to JIS D1618 (Test method of air conditioner for automobiles) and expressed respectively as an improvement percentage to the thermal efficiency of heat-exchanger by conventional method.

Moreover, the results of tensile test conducted with the tube materials after heating for brazing were also put down combiningly in Table 25.

TABLE 24

| No. | Composition of brazing material alloy wt. % | | | | | Composition of core material alloy wt. % | | | | | | | | | Constitution |
| --- | --- | --- | --- | --- | --- | --- | --- | --- | --- | --- | --- | --- | --- | --- | --- |
| | Si | Fe | Cu | Zn | Al | Si | Fe | Cu | Mn | Mg | Zn | Zr | Ti | Al | |
| Fin material | | | | | | | | | | | | | | | |
| A | No brazing agent | | | | | 0.2 | 0.5 | 0.05 | 1.1 | — | 1.0 | — | 0.01 | Bal. | Bare material |
| B | No brazing agent | | | | | 1.10 | 0.65 | — | — | — | " | 0.15 | " | " | Bare material |
| Plate material | | | | | | | | | | | | | | | |
| a | 11.0 | 0.2 | 2.5 | 4.0 | Bal. | 0.8 | 0.4 | 1.3 | 1.1 | — | — | — | 0.18 | " | 10% Brazing |

TABLE 24-continued

| No. | Composition of brazing material alloy wt. % | | | | | Composition of core material alloy wt. % | | | | | | | | | Constitution |
|---|---|---|---|---|---|---|---|---|---|---|---|---|---|---|---|
| | Si | Fe | Cu | Zn | Al | Si | Fe | Cu | Mn | Mg | Zn | Zr | Ti | Al | |
| b | " | " | " | " | " | 0.9 | " | 0.8 | 0.4 | 0.10 | — | — | " | " | material on both sides 10% Brazing material on both sides |
| c | 9.8 | 0.6 | — | — | " | 0.3 | 0.5 | 0.15 | 1.1 | — | — | — | 0.01 | " | 10% Brazing material on both sides |

TABLE 25

| No. | Combination | | Heating temp. for brazing °C. (× 5 min.) | Location of collapse generation | Brazability | Thermal efficiency | Tensile strength of tube after heating for brazing MPa |
|---|---|---|---|---|---|---|---|
| | Fin mterial | Tube material Header material | | | | | |
| Inventive example | | | | | | | |
| ① | A | a | 580 | None | Good | 0.5% More increase than ⑤ | 190 |
| ② | B | " | " | " | " | 2.5% More increase than ⑤ | " |
| ③ | A | b | " | " | " | 0.5% More increase than ⑤ | 160 |
| ④ | B | " | " | " | " | 2.5% More increase than ⑤ | " |
| Conventional example ⑤ | A | c | 600 | " | " | Standard | 130 |
| Comparative example ⑥ | B | " | " | Fin | " | 2.0% More decrease than 5 | " |

As evident from Table 25, the heat-exchangers by the inventive method are being produced without causing the collapse of fin, have high strength after heating, and are excellent also in the thermal efficiency.

EXAMPLE 5

Brazing sheet fin materials cladded both sides of core materials with brazing materials with alloy compositions shown in Table 26 through 29 were fabricated. Namely, these brazing sheet fins are 0.11 mm thick H14 refinings cladded both sides of core material with each 10% brazing material. And, these brazing sheet fin materials No. 1 through No. 67 were heated in $N_2$ gas under the conditions shown in Table 30 and 31 to conduct the drooping test and tensile test. And, these results are put down in Tables 30 and 31.

The drooping test was carried out at a protrusion length of 50 mm.

Moreover, in the tensile test, the brazing material exists on the surface in the case of brazing sheet fin and the accurate determination of the cross sectional area of fin after heating for brazing is difficult, hence, even if the strength may be measured, the reliability is not enough. For this reason, as for the value of strength, the measurement values for 0.06 mm thick bare fin materials comprising the same alloy composition as the alloy composition of core materials constituting these brazing sheet fin materials, which are shown in the most right column of Tables 26 through 29, are shown. Besides, it is known that the strength of brazing sheet fin shows a trend approximately corresponding to the strength of bare fin comprising the same composition of core material.

TABLE 26

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Mn | Zn | In | Sn | Mg | Ni | Cr | Zr | Ti | Al |
| Inventive example | | | | | | | | | | | | | | | | | | | | |
| 1 | 11.0 | 2.5 | 4.0 | — | — | 0.2 | Bal. | 1.5 | 0.3 | 0.1 | 1.1 | — | — | 0.02 | — | — | — | — | — | Bal. |
| 2 | " | " | " | — | — | " | " | 1.4 | 0.2 | 0.2 | " | — | 0.05 | — | — | — | — | — | — | " |

TABLE 26-continued

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Mn | Zn | In | Sn | Mg | Ni | Cr | Zr | Ti | Al |
| 3 | " | " | " | — | — | " | " | " | 0.3 | 0.3 | " | — | 0.03 | 0.02 | — | — | — | — | — | " |
| 4 | 10.5 | 1.5 | 2.5 | — | — | 0.3 | " | " | " | " | " | 1.0 | — | — | — | — | — | — | — | " |
| 5 | 11.0 | 2.5 | 4.0 | — | — | 0.2 | " | " | " | " | " | " | — | — | — | — | — | — | — | " |
| 6 | 10.5 | 1.0 | 2.0 | 0.02 | — | 0.1 | " | " | " | " | " | " | — | — | — | — | — | — | — | " |
| 7 | " | 1.5 | 2.5 | — | — | 0.3 | " | " | 0.2 | 0.1 | " | 1.1 | — | — | — | — | 0.4 | — | — | " |
| 8 | " | " | " | — | — | " | " | 1.3 | " | 0.4 | 0.8 | 2.0 | — | — | — | — | — | — | 0.18 | " |
| 9 | " | " | " | — | — | " | " | 1.6 | 0.3 | 0.3 | 1.0 | 1.5 | — | — | — | — | — | 0.10 | — | " |
| 10 | " | " | " | — | — | " | " | 1.4 | 0.2 | " | 1.1 | " | — | — | — | — | — | 0.15 | 0.01 | " |
| 11 | 11.0 | 1.0 | 1.5 | — | — | 0.4 | " | " | " | " | " | " | — | — | — | — | — | " | " | " |
| 12 | " | 3.0 | 2.0 | — | — | 0.1 | " | " | " | " | " | " | — | — | — | — | — | " | " | " |
| 13 | " | 2.5 | 4.0 | — | — | 0.2 | " | " | " | " | " | " | — | — | — | — | — | " | " | " |
| 14 | 10.5 | 6.0 | 4.5 | — | — | 0.3 | " | " | " | " | " | " | — | — | — | — | — | " | " | " |
| 15 | 9.0 | 3.0 | 1.5 | — | — | 0.1 | " | " | " | " | " | " | — | — | — | — | — | " | " | " |
| 16 | 9.5 | 3.5 | 4.0 | — | — | " | " | " | " | " | " | " | — | — | — | — | — | " | " | " |
| 17 | 11.0 | 2.5 | — | — | 0.05 | " | " | " | " | " | " | " | — | — | — | — | — | " | " | " |
| 18 | " | " | 1.0 | — | 0.03 | " | " | " | " | " | " | " | — | — | — | — | — | " | " | " |
| 19 | 10.5 | 1.0 | 2.0 | 0.02 | — | " | " | " | " | " | " | " | — | — | — | — | — | " | " | " |
| 20 | 11.0 | 3.0 | — | 0.07 | — | 0.2 | " | " | " | " | " | " | — | — | — | — | — | " | " | " |

TABLE 27

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Mn | Zn | In | Sn | Mg | Ni | Cr | Zr | Ti | Al |
| Inventive example | | | | | | | | | | | | | | | | | | | | |
| 21 | 10.5 | 2.5 | 1.0 | 0.02 | — | 0.2 | Bal. | 1.4 | 0.2 | 0.3 | 1.1 | 1.5 | — | — | — | — | — | 0.15 | 0.01 | Bal. |
| 22 | " | 3.0 | 4.0 | 0.01 | — | " | " | " | " | " | " | " | — | — | — | — | — | " | " | " |
| 23 | 10.0 | 1.0 | 3.0 | — | — | " | " | " | " | " | " | " | — | — | — | — | — | " | " | " |
| 24 | 11.0 | 2.5 | 4.0 | — | — | " | " | 1.6 | 0.3 | " | " | 1.0 | — | — | — | — | 0.10 | — | — | " |
| 25 | " | " | " | — | — | " | " | 1.4 | " | 0.4 | " | 2.0 | — | — | — | 0.5 | " | 0.10 | 0.01 | " |
| 26 | " | " | " | — | — | " | " | " | " | " | " | 1.5 | — | — | 0.2 | — | — | — | — | " |
| 27 | " | " | " | — | — | " | " | 1.5 | 0.2 | 0.3 | 0.7 | " | — | — | " | — | — | 0.10 | 0.01 | " |
| 28 | " | " | " | — | — | " | " | 1.3 | 0.5 | 0.4 | 1.1 | 2.0 | — | — | 0.1 | 0.4 | 0.10 | " | 0.10 | " |
| 29 | " | " | " | — | — | " | " | 1.5 | 0.3 | 0.1 | " | — | — | 0.03 | — | — | — | 0.15 | 0.02 | " |
| 30 | " | " | " | — | — | " | " | 1.4 | 0.2 | 0.2 | " | — | 0.05 | — | — | — | — | 0.10 | " | " |
| 31 | 10.5 | 1.5 | 2.5 | — | — | 0.3 | " | " | 0.4 | 0.4 | " | — | 0.04 | 0.01 | — | — | — | 0.15 | 0.01 | " |
| 32 | 11.0 | 2.5 | 4.0 | — | — | 0.2 | " | " | " | " | " | — | " | " | — | — | — | " | " | " |
| 33 | 10.5 | 1.0 | 2.0 | 0.02 | — | 0.1 | " | " | " | " | " | — | " | " | — | — | — | " | " | " |
| 34 | 11.0 | 2.5 | 4.0 | — | — | 0.2 | " | 1.6 | 0.3 | 0.6 | 1.0 | 1.0 | 0.01 | " | — | — | — | — | — | " |
| 35 | 10.5 | 1.5 | 2.5 | — | — | 0.3 | " | " | " | " | " | 0.8 | 0.02 | " | — | — | — | 0.10 | 0.01 | " |
| 36 | 11.0 | 2.5 | 4.0 | — | — | 0.2 | " | 1.5 | " | 0.8 | " | 3.0 | — | — | — | — | — | — | — | " |
| 37 | " | " | " | — | — | " | " | 1.3 | " | 1.0 | " | 4.0 | — | — | — | — | — | 0.15 | 0.01 | " |
| 38 | 10.5 | 1.5 | 2.5 | — | — | 0.3 | " | 1.4 | " | 0.7 | 0.9 | 3.0 | 0.01 | — | — | — | — | — | — | " |
| 39 | 11.0 | 2.5 | 4.0 | — | — | 0.2 | " | " | " | " | " | " | " | — | — | — | — | " | " | " |
| 40 | 10.5 | 1.0 | 2.0 | 0.02 | — | 0.1 | " | " | " | " | " | " | " | — | — | — | — | " | " | " |

TABLE 28

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Mn | Zn | In | Sn | Mg | Ni | Cr | Zr | Ti | Al |
| Inventive example | | | | | | | | | | | | | | | | | | | | |
| 41 | 10.5 | 1.5 | 2.5 | — | — | 0.3 | Bal. | 1.4 | 0.4 | 0.8 | 0.9 | 3.0 | 0.01 | — | — | — | — | 0.15 | 0.02 | Bal. |
| 42 | 11.0 | 2.5 | 4.0 | — | — | 0.2 | " | " | " | " | " | " | " | — | — | — | — | " | " | " |
| 43 | 10.5 | 1.0 | 2.0 | 0.02 | — | 0.1 | " | " | " | " | " | " | " | — | — | — | — | " | " | " |
| 44 | 11.0 | 2.5 | 4.0 | — | — | 0.2 | " | " | 0.2 | 1.8 | 1.1 | 0.8 | 0.03 | 0.01 | — | — | — | — | — | " |
| 45 | " | " | " | — | — | " | " | 1.5 | " | 1.5 | " | " | 0.02 | " | — | — | — | 0.10 | 0.01 | " |
| 46 | 10.5 | 1.5 | 2.5 | — | — | 0.3 | " | 1.4 | 0.3 | 1.2 | 1.0 | 2.5 | — | — | — | — | — | — | — | " |
| 47 | 11.0 | 2.5 | 4.0 | — | — | 0.2 | " | " | " | " | " | " | — | — | — | — | — | 0.15 | 0.01 | " |
| 48 | " | " | " | — | — | " | " | 1.3 | 1.2 | 1.5 | " | 3.5 | — | — | — | — | — | — | — | " |
| 49 | 10.5 | 1.5 | 2.5 | — | — | 0.3 | " | 1.4 | 1.0 | " | " | " | — | — | — | — | — | 0.15 | 0.01 | " |

TABLE 28-continued

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Mn | Zn | In | Sn | Mg | Ni | Cr | Zr | Ti | Al |
| 50 | " | " | " | — | — | " | " | 1.9 | 0.4 | 0.3 | " | — | 0.04 | — | — | — | — | — | — | " |
| 51 | 11.0 | 2.5 | 4.0 | — | — | 0.2 | " | 1.8 | " | " | " | — | " | — | — | — | — | 0.15 | 0.01 | " |
| 52 | " | " | " | — | — | " | " | 2.0 | 0.3 | 0.4 | 1.5 | 1.0 | — | — | — | — | — | — | — | " |
| 53 | 10.5 | 1.5 | 2.5 | — | — | 0.3 | " | 1.9 | 0.4 | 0.2 | " | " | — | — | — | — | — | 0.15 | 0.01 | " |
| 54 | " | " | " | — | — | " | " | 1.8 | 0.2 | 0.4 | 1.0 | 0.7 | 0.02 | 0.01 | — | — | — | — | — | " |
| 55 | 11.0 | 2.5 | 4.0 | — | — | 0.2 | " | " | 0.3 | " | 0.8 | " | " | " | — | — | — | 0.10 | 0.01 | " |
| 56 | " | " | " | — | — | " | " | 1.9 | 0.5 | 0.9 | 1.1 | 3.5 | — | — | — | — | — | — | — | " |
| 57 | 10.5 | 1.5 | 2.5 | — | — | 0.3 | " | 2.1 | 0.3 | 0.7 | " | 3.0 | — | — | — | — | — | 0.10 | 0.01 | " |
| 58 | " | " | " | — | — | " | " | 2.0 | 0.9 | 0.4 | 0.9 | 0.8 | 0.03 | 0.01 | — | — | — | — | — | " |
| 59 | 11.0 | 2.5 | 4.0 | — | — | 0.2 | " | " | 1.1 | 0.3 | " | " | " | " | — | — | — | 0.10 | 0.01 | " |

TABLE 29

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Mn | Zn | In | Sn | Mg | Ni | Cr | Zr | Ti | Al |
| Comparative example | | | | | | | | | | | | | | | | | | | | |
| 60 | 11.0 | 2.5 | 4.0 | — | — | 0.2 | Bal. | 3.5 | 0.2 | — | 1.0 | 1.0 | — | — | — | — | — | 0.15 | 0.01 | Bal. |
| 61 | " | " | " | — | — | " | " | 0.2 | 0.3 | 0.01 | 0.1 | " | — | — | — | — | — | " | " | " |
| 62 | 6.0 | 2.0 | 1.0 | — | — | 0.3 | " | 1.4 | 0.2 | 0.3 | 1.1 | 1.5 | — | — | — | — | — | " | " | " |
| 63 | 11.0 | 9.0 | 8.0 | — | — | " | " | " | " | " | " | " | — | — | — | — | — | " | " | " |
| 64 | " | 0.01 | 0.02 | — | — | " | " | " | " | " | " | " | — | — | — | — | — | " | " | " |
| 65 | 9.8 | — | — | — | — | 0.7 | " | " | " | " | " | " | — | — | — | — | — | " | " | " |
| Conventional example | | | | | | | | | | | | | | | | | | | | |
| 66 | " | — | — | — | — | " | " | 0.2 | 0.5 | 0.04 | " | 1.1 | — | — | — | — | — | — | " | " |
| 67 | " | — | — | — | — | " | " | 0.15 | 0.6 | — | — | " | — | — | — | — | — | 0.15 | " | " |

TABLE 30

| No. of fin material | Heating condition for brazing (× 5 min.) | Amount of drooping mm | | Tensile strength of bare fin material Mpa |
|---|---|---|---|---|
| | | Bare fin material | Brazing sheet fin material | |
| Inventive example | | | | |
| 1 | 580° C. | 6 | 10 | 140 |
| 2 | " | " | " | " |
| 3 | " | " | " | 150 |
| 4 | " | " | " | " |
| 5 | 575° C. | 5 | 8 | " |
| 6 | " | " | " | " |
| 7 | " | " | " | " |
| 8 | " | " | " | " |
| 9 | " | " | 7 | 160 |
| 10 | 580° C. | " | 8 | " |
| 11 | " | " | " | " |
| 12 | " | " | " | " |
| 13 | 575° C. | " | 7 | " |
| 14 | 580° C. | " | 8 | " |
| 15 | " | " | " | " |
| 16 | 575° C. | " | 7 | " |
| 17 | 580° C. | " | 8 | " |
| 18 | " | " | " | " |
| 19 | " | " | " | " |
| 20 | " | " | " | " |
| 21 | 575° C. | 5 | 7 | 160 |
| 22 | 580° C. | " | 8 | " |
| 23 | " | " | " | " |
| 24 | " | 7 | 10 | 150 |
| 25 | " | 5 | 8 | 160 |
| 26 | " | " | " | " |
| 27 | " | " | " | " |
| 28 | 575° C. | " | 7 | " |
| 29 | " | " | " | 140 |
| 30 | " | " | " | " |
| 31 | " | " | " | 150 |
| 32 | 580° C. | " | 8 | " |
| 33 | " | 6 | 10 | " |
| 34 | " | 7 | 12 | 170 |
| 35 | 575° C. | " | 10 | " |
| 36 | " | 8 | 12 | " |
| 37 | 580° C. | " | " | 180 |
| 38 | " | 10 | 15 | " |
| 39 | " | " | " | " |
| 40 | " | " | " | " |

TABLE 31

| No. of fin material | Heating condition for brazing (× 5 min.) | Amount of drooping mm Bare fin material | Amount of drooping mm Brazing sheet fin material | Tensile strength of bare fin material Mpa |
|---|---|---|---|---|
| Inventive example | | | | |
| 41 | 580° C. | 8 | 12 | 170 |
| 42 | 575° C. | 6 | 10 | " |
| 43 | 580° C. | 8 | 12 | " |
| 44 | " | 10 | 15 | 210 |
| 45 | " | 8 | 10 | " |
| 46 | " | 10 | 15 | " |
| 47 | " | 8 | 10 | " |
| 48 | " | 10 | 15 | " |
| 49 | " | 8 | 10 | " |
| 50 | " | 10 | 15 | 180 |
| 51 | " | 8 | 10 | " |
| 52 | " | 10 | 15 | 160 |
| 53 | " | 8 | 10 | 170 |
| 54 | " | 10 | 15 | " |
| 55 | " | 8 | 10 | " |
| 56 | " | 10 | 15 | 190 |
| 57 | " | 9 | 12 | " |
| 58 | " | 10 | " | 170 |
| 59 | 575° C. | 8 | 10 | " |
| Comparative example | | | | |
| 60 | 575° C. | Unmeasurable due to melting | | |
| 61 | " | 8 | 15 | 80 |
| 62 | 610° C. | Unmeasurable due to melting | | |
| 63 | | Fin unproducible | | |
| 64 | 600° C. | Unmeasurable due to melting | | |
| 65 | " | Unmeasurable due to melting | | |
| Conventional example | | | | |
| 66 | 610° C. | 25 | 35 | 110 |
| 67 | " | 30 | 40 | 80 |

While there are no fin materials excellent in the tensile strength and the drooping property in the conventional and comparative examples, all the inventive fin materials show excellent values.

EXAMPLE 6

Brazing sheet fins cladded both sides of core materials with alloy compositions shown in Tables 32 and 33 with brazing materials with alloy compositions shown in the same tables were fabricated. These brazing sheet fins have a plate thickness of 0.11 mm and are H14 refinings cladded both sides of core material with each 10% brazing material. These were heated in $N_2$ gas under the conditions shown in Table 34 to conduct the drooping test and tensile test. And, these results are put down in Table 34.

The drooping test was carried out at a protrusion length of 50 mm. Moreover, in the tensile test, measurement was made by giving the same heating to bare fins with the same composition as that of the core materials of brazing sheet fins in place of brazing sheet fins similarly to Example 5 aforementioned.

TABLE 32

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Mn | Zn | In | Sn | Mg | Ni | Cr | Zr | Ti | Al |
| Inventive example | | | | | | | | | | | | | | | | | | | | |
| 1 | 9.00 | 3.00 | 2.00 | — | — | 0.20 | Bal. | 0.10 | 0.25 | 0.30 | 1.10 | 0.50 | — | — | — | — | — | — | — | Bal. |
| 2 | 10.0 | 1.50 | 1.00 | — | — | " | " | 0.25 | 0.20 | 0.15 | " | 0.70 | — | — | — | — | — | — | 0.01 | " |
| 3 | " | 3.00 | " | 0.10 | — | " | " | 0.10 | 0.70 | 0.30 | " | 1.00 | — | — | — | — | — | — | — | " |
| 4 | " | " | " | — | 0.10 | " | " | " | " | " | " | " | — | — | 0.10 | — | — | — | — | " |
| 5 | 9.00 | " | 2.00 | — | — | " | " | 0.25 | " | 0.15 | " | 0.70 | — | — | — | — | — | 0.15 | — | " |
| 6 | 10.0 | " | " | — | — | " | " | 0.80 | 0.25 | 0.30 | " | 1.00 | — | — | — | — | — | — | — | " |
| 7 | 9.00 | 1.50 | 1.00 | — | — | " | " | 1.10 | 0.20 | 0.15 | " | 0.10 | — | — | — | 0.10 | — | — | — | " |
| 8 | 10.0 | 3.00 | 2.00 | — | — | " | " | 0.80 | 0.70 | 0.30 | " | 1.00 | — | — | 0.50 | — | — | — | — | " |
| 9 | " | " | " | — | — | " | " | " | " | " | " | " | — | — | 1.50 | — | — | — | — | " |
| 10 | 9.00 | 1.50 | 1.00 | — | — | " | " | 0.25 | " | 0.15 | " | 0.50 | — | 0.10 | — | — | — | 0.15 | — | " |
| 11 | 10.0 | 3.00 | 2.00 | — | — | " | " | 0.10 | 1.50 | 0.30 | " | 1.00 | — | — | — | — | — | — | — | " |
| 12 | " | " | " | — | — | " | " | " | " | " | " | " | — | — | — | — | — | 0.15 | 0.01 | " |
| 13 | 9.00 | 1.50 | 1.00 | — | — | " | " | 0.25 | 0.70 | 0.15 | " | 0.70 | — | 0.10 | — | — | — | " | — | " |
| 14 | 10.0 | 3.00 | 2.00 | — | — | " | " | 1.10 | 1.50 | 0.30 | " | 1.00 | — | — | — | — | — | " | — | " |
| 15 | 11.5 | 1.50 | " | — | — | " | " | 0.25 | 0.20 | 0.50 | " | — | 0.05 | — | — | — | — | — | — | " |
| 16 | " | " | " | — | — | " | " | " | " | " | " | — | " | — | — | — | — | 0.05 | — | " |
| 17 | " | 2.50 | 3.00 | — | — | " | " | " | 0.25 | 1.00 | " | 1.50 | — | — | — | — | — | — | — | " |
| 18 | " | " | " | — | — | " | " | " | " | " | " | " | — | — | 0.40 | — | — | — | 0.01 | " |

TABLE 32-continued

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Mn | Zn | In | Sn | Mg | Ni | Cr | Zr | Ti | Al |
| 19 | " | " | 4.00 | — | — | " | " | 0.20 | " | 1.50 | " | 3.50 | — | — | 0.10 | — | — | — | — | " |
| 20 | " | " | " | — | — | " | " | " | " | " | " | " | — | — | " | — | — | 0.15 | — | " |
| 21 | " | " | 3.00 | — | — | " | " | 0.80 | " | 1.00 | " | 1.50 | — | 0.10 | — | — | — | — | — | " |

TABLE 33

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Mn | Zn | In | Sn | Mg | Ni | Cr | Zr | Ti | Al |
| Inventive example | | | | | | | | | | | | | | | | | | | | |
| 22 | 11.5 | 2.50 | 3.00 | — | — | 0.20 | Bal. | 0.80 | 0.25 | 1.00 | 1.10 | 1.50 | — | 0.10 | — | — | — | 0.15 | 0.01 | Bal. |
| 23 | " | 4.00 | 4.00 | — | — | " | " | 1.10 | " | 1.50 | " | 3.50 | — | — | — | — | — | — | — | " |
| 24 | " | " | " | — | — | " | " | " | " | " | " | " | — | — | — | — | — | 0.15 | — | " |
| 25 | " | " | " | — | — | " | " | 0.80 | 0.70 | " | " | " | — | — | — | — | — | — | — | " |
| 26 | " | " | " | — | — | " | " | " | " | " | " | " | — | — | — | — | — | 0.15 | 0.15 | — |
| 27 | " | " | " | — | — | " | " | 1.10 | " | " | " | " | — | — | — | — | — | — | — | " |
| 28 | " | " | " | — | — | " | " | " | " | " | " | " | — | — | — | — | — | — | 0.10 | " |
| 29 | " | " | " | — | — | " | " | " | " | " | " | " | — | — | — | — | — | 0.15 | — | " |
| 30 | " | " | " | — | — | " | " | " | " | " | " | " | — | — | — | 1.50 | — | — | — | " |
| Comparative example | | | | | | | | | | | | | | | | | | | | |
| 31 | " | 9.00 | 2.00 | — | — | 0.70 | " | 0.20 | " | 0.15 | " | 0.30 | — | — | — | — | — | — | — | " |
| 32 | " | 2.50 | 7.00 | — | — | " | " | " | " | " | " | 0.50 | — | — | — | — | — | — | — | " |
| 33 | " | " | 3.00 | 0.10 | — | 0.20 | " | 1.50 | " | " | " | 0.70 | — | — | — | — | — | — | — | " |
| 34 | 10.0 | — | — | — | — | 0.70 | " | 0.20 | " | 0.70 | " | 1.50 | — | — | — | — | — | — | — | " |
| 35 | " | — | — | — | — | " | " | " | 2.50 | 0.15 | " | 0.50 | — | — | — | — | — | — | — | " |
| 36 | " | — | — | — | — | " | " | " | 0.70 | " | 2.20 | " | — | — | — | — | — | — | — | " |
| Conventional example | | | | | | | | | | | | | | | | | | | | |
| 37 | " | — | — | — | — | " | " | " | " | " | 1.10 | 0.30 | — | — | — | — | — | — | — | " |
| 38 | 11.0 | — | — | — | — | " | " | " | " | " | 0.50 | " | 0.70 | — | — | — | — | — | — | " |

TABLE 34

| No. of fin material | Heating condition for brazing × 5 min. | Amount of drooping mm | Tensile strength MPa |
|---|---|---|---|
| Inventive example | | | |
| 1 | 575° C. | 12 | 150 |
| 2 | " | 9 | " |
| 3 | 580° C. | " | 160 |
| 4 | " | 10 | " |
| 5 | " | 11 | " |
| 6 | " | 9 | 170 |
| 7 | " | 11 | 180 |
| 8 | " | 9 | 170 |
| 9 | " | " | " |
| 10 | " | 11 | " |
| 11 | " | 9 | 180 |
| 12 | " | " | " |
| 13 | " | 11 | 170 |
| 14 | " | 9 | 180 |
| 15 | " | 8 | 190 |
| 16 | " | " | " |
| 17 | " | " | 210 |
| 18 | " | " | " |
| 19 | " | " | 230 |
| 20 | " | 7 | " |
| 21 | 575° C. | 7 | 200 |
| 22 | " | " | 210 |
| 23 | " | " | " |
| 24 | " | " | 220 |
| 25 | " | " | " |
| 26 | " | " | " |
| 27 | " | " | 240 |
| 28 | " | " | " |
| 29 | " | " | " |
| 30 | " | " | " |
| Comparative example | | | |
| 31 | Fin unproducible | | |
| 32 | Fin unproducible | | |
| 33 | 610° C. | Fin melting | |
| 34 | 600° C. | 25 | 150 |
| 35 | 610° C. | Fin buckling | |
| 36 | Corrugate unmoldable | | |

TABLE 34-continued

| No. of fin material | Heating condition for brazing × 5 min. | Amount of drooping mm | Tensile strength MPa |
|---|---|---|---|
| Conventional example | | | |
| 37 | 610° C. | 35 | 130 |
| 38 | " | 45 | 150 |

While there are no fin materials excellent in the tensile strength and the drooping property in the conventional and comparative examples, all the inventive fin materials show excellent values.

Next, the brazing sheet fins shown in tables 32 and 33 aforementioned and JIS 1050 extrusion tube (4.00 mm) used ordinarily were combined and heated in $N_2$ gas for 5 minutes at 575° C. for the combinations with fin materials No. 1 through No. 30 in the inventive examples and for 5 minutes at 600° C. for ones in the comparative and conventional examples to fabricate the serpentine type condenser cores shown in FIG. 2. With these cores, the CASS test according to JIS H8681 was conducted for 750 hours and the depth of pitting corrosion of tubes after testing was measured to confirm the sacrificial effect of fins. The measurement results are shown in Table 35. Besides, the natural electrical potential of fins measured in 5% NaCl solution is also shown in Table 35.

TABLE 35

| No. of fin material | Natural electrical potential of fin material (mV vs SCE) (5% NaCl) | Max. depth of pitting corrosion after CASS test (mm) (tube 750 hr) |
|---|---|---|
| Inventive example | | |
| 1 | −800 | 2.0 |
| 2 | −830 | 2.2 |
| 3 | −850 | 2.0 |
| 4 | " | " |
| 5 | −830 | 2.2 |
| 6 | −850 | 2.0 |
| 7 | −730 | 3.2 |
| 8 | −840 | 2.0 |
| 9 | " | " |
| 10 | −820 | 2.4 |
| 11 | −850 | 2.0 |
| 12 | −840 | " |
| 13 | −830 | 2.2 |
| 14 | " | " |
| 15 | −860 | 1.4 |
| 16 | " | " |
| 17 | " | 1.2 |
| 18 | −880 | " |
| 19 | −900 | " |
| 20 | " | " |
| 21 | −920 | 1.0 |
| 22 | " | " |
| 23 | −900 | 1.2 |
| 24 | " | " |
| 25 | " | " |
| 26 | " | " |
| 27 | −890 | " |
| 28 | " | " |

TABLE 35-continued

| No. of fin material | Natural electrical potential of fin material (mV vs SCE) (5% NaCl) | Max. depth of pitting corrosion after CASS test (mm) (tube 750 hr) |
|---|---|---|
| 29 | " | " |
| 30 | " | " |
| Comparative example | | |
| 31 | | Fin unproducible |
| 32 | | Fin unproducible |
| 33 | | Fin melting, unmeasurable |
| 34 | −830 | Piercing |
| 35 | | Fin buckling, unmeasurable |
| 36 | | Corrugate unmoldable |
| Conventional example | | |
| 37 | −800 | Piercing |
| 38 | −780 | Piercing |

Note)
No. 1–30: brazed at 575° C.
No. 31–38: braced at 600° C.

The fins of the inventive examples show baser natural electrical potential and also shallower pitting corrosion of condenser tubes over comparative and conventional examples.

EXAMPLE 7

Brazing sheet fins cladded both sides of core materials with alloy compositions shown in Tables 36 through 38 with brazing materials shown in the same tables were fabricated. These brazing sheet fins have a plate thickness of 0.11 mm and are H14 refinings cladded both sides of core material with each 10% brazing material. These were heated for brazing in $N_2$ gas under the conditions shown in tables 39 and 40 to conduct the drooping test, tensile test and measurement of electroconductivity. And, these results are put down in Tables 39 and 40.

The drooping test was carried out at a protrusion length of 50 mm.

Moreover, the tensile test was substituted by measuring the strength of those given the same heating to 0.06 mm thick bare fins With the same composition as that of the core materials of said brazing sheet fins similarly to Example 5 aforementioned.

Furthermore, the electroconductivity of brazing sheet fins was substituted by measuring the electroconductivity of those given to the same heating to bare fines with the same composition as that of said core materials, since the brazing material exists on the surface of these fins and the cross sectional area of fins after brazing cannot be measured accurately. It is known that the electroconductivity of brazing sheet fin shows a trend approximately corresponding to the electroconductivity of bare fin with the same composition as that of the core material of fin. Besides, the electroconductivity is an index of thermal conductivity and, as the electroconductivity of fin improves by 5% IACS, the thermal efficiency of heat-exchanger improves by about 1%.

TABLE 36

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Zn | In | Sn | Mg | Mn | Ni | Cr | Zr | Ti | Al |
| Inventive example | | | | | | | | | | | | | | | | | | | | |
| 1 | 11.0 | 2.5 | 4.0 | — | — | 0.2 | Bal. | 1.5 | 0.1 | 0.2 | 0.8 | 0.05 | — | — | — | 0.6 | — | 0.10 | 0.01 | Bal. |
| 2 | 10.5 | 1.5 | 2.5 | — | — | 0.3 | " | 1.3 | 1.2 | 0.3 | — | 0.04 | — | — | — | — | — | — | — | " |
| 3 | 11.0 | 2.5 | 4.0 | — | — | 0.2 | " | " | " | 0.4 | 1.0 | 0.02 | — | — | — | — | — | — | — | " |
| 4 | 10.5 | 1.0 | 2.0 | 0.02 | — | 0.1 | " | 1.4 | 1.1 | 0.5 | 3.0 | — | — | — | — | — | — | — | — | " |
| 5 | 11.0 | 2.5 | 4.0 | — | — | 0.2 | " | 1.5 | 1.0 | 0.3 | 1.0 | 0.02 | — | — | — | 0.3 | — | — | — | " |
| 6 | " | " | " | — | — | " | " | " | 0.8 | " | 0.9 | 0.01 | — | — | — | 0.9 | — | — | — | " |
| 7 | " | " | " | — | — | " | " | " | 0.9 | " | " | 0.03 | — | — | — | 0.4 | — | — | 0.01 | " |
| 8 | 10.5 | 1.5 | 2.5 | — | — | 0.3 | " | " | 1.2 | " | — | 0.05 | — | — | — | 0.3 | — | — | " | " |
| 9 | 11.0 | 2.5 | 4.0 | — | — | 0.2 | " | " | 1.1 | " | 0.9 | 0.01 | — | — | — | 1.0 | — | — | 0.02 | " |
| 10 | 10.5 | 1.0 | 2.0 | 0.02 | — | 0.1 | " | " | " | " | 2.5 | — | — | — | — | 1.1 | — | — | " | " |
| 11 | 11.0 | 2.5 | 4.0 | — | — | 0.2 | " | " | 0.8 | 0.4 | 1.0 | 0.01 | — | — | — | — | — | — | 0.20 | " |
| 12 | " | " | " | — | — | " | " | " | 0.7 | " | " | " | — | — | — | — | — | 0.15 | — | " |
| 13 | " | " | " | — | — | " | " | " | 1.2 | " | " | " | — | — | — | 0.2 | — | " | 0.01 | " |
| 14 | " | " | " | — | — | " | " | " | 1.0 | " | — | — | 0.03 | — | — | 0.6 | — | 0.10 | " | " |
| 15 | " | " | " | — | — | " | " | " | 1.1 | " | — | 0.05 | — | — | — | 0.7 | — | " | " | " |
| 16 | " | " | " | — | — | " | " | " | 1.0 | " | 1.0 | — | — | — | — | 0.6 | — | " | " | " |
| 17 | " | 1.0 | 1.5 | — | — | 0.4 | " | " | " | 0.5 | 1.2 | 0.02 | — | — | — | " | — | " | " | " |
| 18 | " | 3.0 | 2.0 | — | — | 0.1 | " | " | " | " | " | " | — | — | — | " | — | " | " | " |
| 19 | " | 2.5 | 4.0 | — | — | 0.2 | " | " | " | " | " | " | — | — | — | " | — | " | " | " |
| 20 | 10.5 | 6.0 | 4.5 | — | — | 0.3 | " | " | " | " | " | " | — | — | — | " | — | " | " | " |
| 21 | 9.0 | 3.0 | 1.5 | — | — | 0.1 | " | " | " | " | " | " | — | — | — | " | — | " | " | " |

TABLE 37

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Zn | In | Sn | Mg | Mn | Ni | Cr | Zr | Ti | Al |
| Inventive example | | | | | | | | | | | | | | | | | | | | |
| 22 | 9.5 | 3.5 | 4.0 | — | — | 0.1 | Bal. | 1.5 | 1.0 | 0.5 | 1.2 | 0.02 | — | — | — | 0.6 | — | 0.01 | 0.01 | Bal. |
| 23 | 11.0 | 2.5 | — | — | 0.05 | " | " | " | " | " | " | " | — | — | — | " | — | " | " | " |
| 24 | " | " | 1.0 | — | 0.03 | " | " | " | " | " | " | " | — | — | — | " | — | " | " | " |
| 25 | 10.5 | 1.0 | 2.0 | 0.02 | — | " | " | " | " | " | " | " | — | — | — | " | — | " | " | " |
| 26 | 11.0 | 3.0 | — | 0.07 | — | 0.2 | " | " | " | " | " | " | — | — | — | " | — | " | " | " |
| 27 | 10.5 | 2.5 | 1.0 | 0.02 | — | " | " | " | " | " | " | " | — | — | — | " | — | " | " | " |
| 28 | " | 3.0 | 4.0 | 0.01 | — | " | " | " | " | " | " | " | — | — | — | " | — | " | " | " |
| 29 | 11.0 | 2.5 | " | — | — | " | " | 1.4 | 1.2 | 0.4 | 0.8 | " | 0.01 | — | — | 0.7 | — | 0.08 | " | " |
| 30 | " | " | " | — | — | " | " | 1.3 | " | 0.5 | 3.0 | — | — | — | — | " | — | 0.15 | " | " |
| 31 | " | " | " | — | — | " | " | 1.4 | " | 0.4 | 2.5 | 0.01 | — | — | — | " | — | 0.08 | " | " |
| 32 | " | " | " | — | — | " | " | " | 1.0 | " | 1.0 | 0.02 | — | — | — | — | 0.15 | — | — | " |
| 33 | " | " | " | — | — | " | " | " | 0.9 | " | " | " | — | 0.10 | — | — | — | — | — | " |
| 34 | " | " | " | — | — | " | " | " | 1.2 | " | " | " | — | 0.08 | — | 0.6 | — | 0.10 | 0.02 | " |
| 35 | " | " | " | — | — | " | " | 1.6 | 0.9 | " | " | " | — | — | 0.2 | — | — | — | — | " |
| 36 | " | " | " | — | — | " | " | " | 1.0 | " | " | " | — | — | 0.1 | — | — | 0.12 | — | " |
| 37 | " | " | " | — | — | " | " | 1.5 | " | " | " | " | — | — | 0.08 | 0.3 | — | 0.08 | 0.02 | " |
| 38 | " | " | " | — | — | " | " | 1.6 | " | " | " | " | — | 0.08 | 0.1 | 0.8 | 0.08 | 0.10 | " | " |
| 39 | 10.5 | 1.0 | 2.0 | 0.02 | — | 0.1 | " | 1.5 | " | 1.0 | — | 0.08 | — | — | — | — | — | — | — | " |
| 40 | " | 1.5 | 2.5 | — | — | 0.3 | " | " | " | 1.2 | 1.2 | 0.05 | — | — | — | — | — | — | — | " |
| 41 | 11.0 | 2.5 | 4.0 | — | — | 0.2 | " | " | " | 1.0 | 3.5 | — | — | — | — | — | — | — | — | " |
| 42 | 10.5 | 1.0 | 2.0 | 0.02 | — | 0.1 | " | 1.4 | 1.1 | " | — | 0.05 | — | — | — | — | — | 0.5 | 0.01 | " |

TABLE 38

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Zn | In | Sn | Mg | Mn | Ni | Cr | Zr | Ti | Al |
| Inventive example | | | | | | | | | | | | | | | | | | | | |
| 43 | 10.5 | 1.5 | 2.5 | — | — | 0.3 | Bal. | 1.6 | 1.1 | 0.9 | 1.0 | 0.04 | — | — | — | 0.6 | — | — | 0.01 | Bal. |
| 44 | 11.0 | 2.5 | 4.0 | — | — | 0.2 | " | 1.5 | 0.7 | 0.8 | 3.0 | — | — | — | — | " | — | — | " | " |
| 45 | 10.5 | 1.0 | 2.0 | 0.02 | — | 0.1 | " | " | " | 1.0 | 1.2 | — | 0.07 | — | — | " | — | 0.08 | " | " |

TABLE 38-continued

| No. of Fin material | Composition of brazing material alloy wt. % | | | | | | | Composition of core material alloy wt. % | | | | | | | | | | | |
|---|---|---|---|---|---|---|---|---|---|---|---|---|---|---|---|---|---|---|---|
| | Si | Cu | Zn | In | Sn | Fe | Al | Si | Fe | Cu | Zn | In | Sn | Mg | Mn | Ni | Cr | Zr | Ti | Al |
| 46 | " | 1.5 | 2.5 | — | — | 0.3 | " | " | " | 1.0 | 1.0 | 0.02 | — | — | — | " | — | 0.10 | 0.02 | " |
| 47 | 11.0 | 2.5 | 4.0 | — | — | 0.2 | " | " | 1.1 | " | 3.5 | — | — | — | — | 0.7 | — | " | 0.01 | " |
| 48 | 10.5 | 1.0 | 2.0 | 0.02 | — | 0.1 | " | 2.0 | 1.2 | " | 1.0 | 0.02 | — | — | — | 0.6 | — | 0.12 | " | " |
| Comparative example | | | | | | | | | | | | | | | | | | | | |
| 49 | 11.0 | 2.5 | 4.0 | — | — | 0.2 | " | 3.5 | 0.2 | — | " | — | — | — | — | 1.0 | — | 0.15 | " | " |
| 50 | " | " | " | — | — | " | " | 1.6 | 1.2 | 0.4 | 0.8 | 0.02 | — | — | — | 1.5 | 1.0 | 0.15 | " | " |
| 51 | 6.0 | 2.0 | 1.0 | — | — | 0.3 | " | 1.5 | 1.0 | 0.5 | 1.2 | " | — | — | — | 0.6 | — | 0.10 | " | " |
| 52 | 11.0 | 9.0 | 8.0 | — | — | " | " | " | " | " | " | " | — | — | — | " | — | " | " | " |
| 53 | " | 0.01 | 0.02 | — | — | " | " | " | " | " | " | " | — | — | — | " | — | " | " | " |
| 54 | 9.8 | — | — | — | — | 0.7 | " | " | " | " | " | " | — | — | — | — | — | — | " | " |
| Conventional example | | | | | | | | | | | | | | | | | | | | |
| 55 | " | — | — | — | — | " | " | 0.2 | 0.5 | 0.04 | 1.1 | — | — | — | 1.1 | — | — | — | " | " |
| 56 | " | — | — | — | — | " | " | 0.15 | 0.6 | — | " | — | — | — | — | — | — | 0.15 | " | " |

TABLE 39

| No. of fin material | Heating condition for brazing (× 5 min.) | Amount of drooping mm | | Tensile strength MPa | Electro-conductivity % IACS |
|---|---|---|---|---|---|
| | | Bare fin material | Brazing sheet fin material | | |
| Inventive example | | | | | |
| 1 | 580° C. | 5 | 8 | 140 | 52 |
| 2 | 575° C. | 6 | 10 | " | 53 |
| 3 | " | " | " | " | 52 |
| 4 | 580° C. | 7 | 12 | " | 51 |
| 5 | 575° C. | 5 | 8 | 150 | 52 |
| 6 | " | " | " | " | " |
| 7 | " | " | " | " | " |
| 8 | " | " | " | " | 53 |
| 9 | " | " | " | " | 52 |
| 10 | 580° C. | 6 | 10 | " | 51 |
| 11 | 575° C. | 5 | 8 | 140 | " |
| 12 | " | " | " | " | " |
| 13 | " | " | " | " | " |
| 14 | " | " | " | 150 | 52 |
| 15 | " | " | " | " | " |
| 16 | " | " | " | " | 51 |
| 17 | 580° C. | 7 | 11 | " | " |
| 18 | " | " | " | " | " |
| 19 | " | " | " | " | " |
| 20 | " | " | " | " | " |
| 21 | 575° C. | 5 | 8 | 150 | 51 |
| 22 | " | " | " | " | " |
| 23 | 580° C. | 7 | 11 | " | " |
| 24 | " | " | " | " | " |
| 25 | " | " | " | " | " |
| 26 | " | " | " | " | " |
| 27 | " | " | " | " | " |
| 28 | " | " | " | " | " |
| 29 | 575° C. | 5 | 9 | " | " |
| 30 | " | " | " | " | 50 |
| 31 | " | " | " | " | " |
| 32 | 580° C. | 7 | 10 | 140 | 52 |
| 33 | " | 10 | 13 | " | 51 |
| 34 | " | 8 | 12 | 150 | " |
| 35 | 575° C. | 5 | 8 | 140 | " |
| 36 | " | " | " | " | 50 |
| 37 | " | " | " | 150 | " |
| 38 | 580° C. | 7 | 11 | " | " |
| 39 | " | 8 | 12 | " | 51 |
| 40 | " | " | " | " | " |

TABLE 40

| No. of fin material | Heating condition for brazing (× 5 min.) | Amount of drooping mm | | Tensile strength MPa | Electro-conductivity % IACS |
|---|---|---|---|---|---|
| | | Bare fin material | Brazing sheet fin material | | |
| Inventive example | | | | | |
| 41 | 575° C. | 6 | 10 | 150 | 50 |
| 42 | 580° C. | 9 | 12 | . " | 51 |
| 43 | " | " | " | 160 | 50 |
| 44 | " | 6 | 10 | " | 49 |
| 45 | " | " | 9 | " | " |
| 46 | " | " | " | " | 48 |
| 47 | " | " | " | " | " |
| 48 | " | " | " | " | " |
| Comparative example | | | | | |
| 49 | 575° C. | Unmeasurable due to melting | | | |
| 50 | " | 7 | 10 | 150 | 34 |
| 51 | 610° C. | Unmeasurable due to melting | | | |
| 52 | | Brazing sheet fin unproducible | | | |
| 53 | 600° C. | Unmeasurable due to melting | | | |
| 54 | " | Unmeasurable due to melting | | | |
| Conventional example | | | | | |
| 55 | 610° C. | 25 | 35 | 110 | 36 |
| 56 | " | 30 | 40 | 80 | 52 |

As evident from Tables 39 and 40, while there are no fin materials excellent in the tensile strength and the drooping property in the conventional and comparative examples, all the inventive fin materials show excellent values.

EXAMPLE 8

Brazing sheet fin materials cladded both sides of core materials with alloy compositions shown in tables 41 through 43 with brazing materials shown in the same tables were fabricated. The plate thickness of these brazing sheet fins is 0.11 mm and they are H14 refinings cladded both sides of core material with each 10% brazing material. Samples were cut out from the fin materials thus obtained, which were heated for brazing in N₂ gas under the conditions shown in Tables 44 and 45 to conduct the drooping test.

For the drooping test, the protrusion length was made to be 50 mm. Moreover, the electroconductivity of samples after heating was measured under the conditions in the same tables. Besides, the measurement of electroconductivity was conducted similarly to Example 7 aforementioned.

These results are shown in Tables 44 and 45.

TABLE 41

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Zn | In | Sn | Mg | Mn | Ni | Cr | Zr | Ti | Al |
| Inventive example | | | | | | | | | | | | | | | | | | | | |
| 1 | 11.0 | 2.5 | 4.0 | — | — | 0.2 | Bal. | 0.5 | 0.1 | 0.2 | 0.8 | 0.05 | — | — | — | 0.6 | — | 0.10 | 0.01 | Bal. |
| 2 | " | " | " | — | — | " | " | 0.4 | 1.2 | 0.4 | 1.0 | 0.02 | — | — | — | — | — | — | — | " |
| 3 | " | " | " | — | — | " | " | 0.5 | 1.0 | 0.3 | " | " | — | — | — | 0.3 | — | — | — | " |
| 4 | " | " | " | — | — | " | " | " | 0.8 | " | 0.9 | 0.01 | — | — | — | 0.9 | — | — | — | " |
| 5 | " | " | " | — | — | " | " | " | 0.9 | " | " | 0.03 | — | — | — | 0.4 | — | — | 0.01 | " |
| 6 | 10.5 | 1.0 | 2.0 | 0.02 | — | 0.1 | " | " | 1.1 | " | 2.5 | — | — | — | — | 1.1 | — | — | 0.02 | " |
| 7 | 11.0 | 2.5 | 4.0 | — | — | 0.2 | " | " | 0.8 | 0.4 | 1.0 | 0.01 | — | — | — | — | — | — | 0.20 | " |
| 8 | " | " | " | — | — | " | " | " | 0.7 | " | " | " | — | — | — | — | — | 0.15 | — | " |
| 9 | " | " | " | — | — | " | " | " | 1.0 | " | — | — | 0.03 | — | — | 0.6 | — | 0.10 | 0.01 | " |
| 10 | " | " | " | — | — | " | " | " | 1.1 | " | — | 0.05 | — | — | — | 0.7 | — | " | " | " |
| 11 | " | " | " | — | — | 0.4 | " | " | 1.0 | 0.5 | 1.2 | 0.02 | — | — | — | 0.6 | — | " | " | " |
| 12 | " | " | " | — | — | 0.2 | " | 0.4 | 1.2 | 0.4 | 0.8 | " | 0.01 | — | — | 0.7 | — | 0.08 | " | " |
| 13 | " | " | " | — | — | " | " | " | " | 0.5 | 3.0 | — | — | — | — | — | " | — | 0.15 | " | " |
| 14 | " | " | " | — | — | " | " | " | 1.0 | 0.4 | 1.0 | 0.02 | — | — | — | — | 0.15 | — | — | " |
| 15 | " | " | " | — | — | " | " | " | 1.2 | " | " | " | — | 0.08 | — | 0.6 | — | 0.10 | 0.02 | " |
| 16 | " | " | " | — | — | " | " | 0.6 | 1.0 | " | " | " | — | — | 0.1 | — | — | 0.12 | — | " |
| 17 | " | " | " | — | — | " | " | 0.5 | " | " | " | " | — | — | 0.08 | 0.3 | — | 0.08 | 0.02 | " |
| 18 | " | " | " | — | — | " | " | 0.6 | " | " | " | " | — | 0.08 | 0.1 | 0.8 | 0.08 | 0.10 | " | " |
| 19 | 10.5 | 1.5 | 2.5 | — | — | 0.3 | " | 0.5 | " | 1.2 | 1.2 | 0.05 | — | — | — | — | — | — | — | " |
| 20 | " | 1.0 | 2.0 | 0.02 | — | 0.1 | " | 0.4 | 1.1 | 1.0 | — | " | — | — | — | 0.5 | — | — | 0.01 | " |
| 21 | " | 1.5 | 2.5 | — | — | 0.8 | " | 0.6 | " | 0.9 | 1.0 | 0.04 | — | — | — | 0.6 | — | — | " | " |
| 22 | 11.0 | 2.5 | 4.0 | — | — | 0.2 | " | 0.5 | 0.7 | 0.8 | 3.0 | — | — | — | — | — | " | — | — | " | " |

TABLE 42

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Zn | In | Sn | Mg | Mn | Ni | Cr | Zr | Ti | Al |
| Inventive example | | | | | | | | | | | | | | | | | | | | |
| 23 | 10.5 | 1.0 | 2.0 | 0.02 | — | 0.1 | Bal. | 0.5 | 1.0 | 1.2 | — | 0.07 | — | — | — | 0.6 | — | 0.08 | 0.01 | Bal. |
| 24 | " | 1.5 | 2.5 | — | — | 0.3 | " | " | " | 1.0 | 1.0 | 0.02 | — | — | — | " | — | 0.10 | 0.02 | " |
| 25 | 11.0 | 2.5 | 4.0 | — | — | 0.2 | " | " | 1.1 | " | 3.5 | — | — | — | — | 0.7 | — | " | 0.01 | " |
| 26 | 10.5 | 1.0 | 2.0 | 0.02 | — | 0.1 | " | 1.0 | 1.2 | " | 1.0 | 0.02 | — | — | — | 0.6 | — | 0.12 | " | " |
| 27 | 11.0 | " | 1.5 | — | — | 0.2 | " | 0.5 | 1.0 | 0.5 | 1.2 | " | — | — | — | " | — | 0.10 | " | " |
| 28 | 10.5 | 6.0 | 4.5 | — | — | 0.3 | " | " | " | " | " | " | — | — | — | " | — | " | " | " |
| 29 | 9.0 | 3.0 | 1.5 | — | — | 0.1 | " | " | " | " | " | " | — | — | — | " | — | " | " | " |
| 30 | 9.5 | 3.5 | 4.0 | — | — | " | " | " | " | " | " | " | — | — | — | " | — | " | " | " |
| 31 | 11.0 | 2.5 | 1.0 | — | 0.03 | " | " | " | " | " | " | " | — | — | — | " | — | " | " | " |
| 32 | 10.5 | 1.0 | 2.0 | 0.02 | — | " | " | " | " | " | " | " | — | — | — | " | — | " | " | " |
| 33 | " | 3.0 | 4.0 | 0.01 | — | 0.2 | " | " | " | " | " | " | — | — | — | " | — | " | " | " |
| Comparative example | | | | | | | | | | | | | | | | | | | | |
| 34 | 9.8 | — | — | — | — | 0.7 | " | " | 0.1 | 0.2 | 0.8 | 0.05 | — | — | — | " | — | " | " | " |
| 35 | " | — | — | — | — | " | " | 0.4 | 1.2 | 0.4 | 1.0 | 0.02 | — | — | — | — | — | — | — | " |
| 36 | " | — | — | — | — | " | " | 0.5 | 1.0 | 0.3 | " | " | — | — | — | 0.3 | — | — | — | " |
| 37 | " | — | — | — | — | " | " | " | 0.8 | " | 0.9 | 0.01 | — | — | — | 0.9 | — | — | — | " |
| 38 | " | — | — | — | — | " | " | " | 0.9 | " | " | 0.03 | — | — | — | 0.4 | — | — | 0.01 | " |
| 39 | " | — | — | — | — | " | " | " | 1.1 | " | 2.5 | — | — | — | — | 1.1 | — | — | 0.02 | " |
| 40 | " | — | — | — | — | " | " | " | 0.8 | 0.4 | 1.0 | 0.01 | — | — | — | — | — | — | 0.20 | " |
| 41 | " | — | — | — | — | " | " | " | 0.7 | " | " | " | — | — | — | — | — | 0.15 | — | " |
| 42 | " | — | — | — | — | " | " | " | 1.0 | " | — | — | 0.03 | — | — | 0.6 | — | 0.10 | 0.01 | " |
| 43 | " | — | — | — | — | " | " | " | 1.1 | " | — | 0.05 | — | — | — | 0.7 | — | " | " | " |
| 44 | " | — | — | — | — | " | " | " | 1.0 | 0.5 | 1.2 | 0.02 | — | — | — | 0.6 | — | " | " | " |

TABLE 43

| No. of Fin material | Composition of brazing material alloy wt. % | | | | | | | Composition of core material alloy wt. % | | | | | | | | | | | | |
|---|---|---|---|---|---|---|---|---|---|---|---|---|---|---|---|---|---|---|---|---|
| | Si | Cu | Zn | In | Sn | Fe | Al | Si | Fe | Cu | Zn | In | Sn | Mg | Mn | Ni | Cr | Zr | Ti | Al |
| Comparative example | | | | | | | | | | | | | | | | | | | | |
| 45 | 9.8 | — | — | — | — | 0.7 | Bal. | 0.4 | 1.2 | 0.4 | 0.8 | 0.02 | 0.01 | — | — | 0.7 | — | 0.08 | 0.01 | Bal. |
| 46 | " | — | — | — | — | " | " | " | " | 0.5 | 1.0 | — | — | — | — | " | — | 0.15 | " | " |
| 47 | " | — | — | — | — | " | " | " | 1.0 | 0.4 | 1.0 | 0.02 | — | — | — | — | 0.15 | — | — | " |
| 48 | " | — | — | — | — | " | " | " | 1.2 | " | " | " | — | 0.08 | — | 0.6 | — | 0.10 | 0.02 | " |
| 49 | " | — | — | — | — | " | " | 0.6 | 1.0 | " | " | " | — | — | 0.1 | — | — | 0.12 | — | " |
| 50 | " | — | — | — | — | " | " | 0.5 | " | " | " | " | — | — | 0.08 | 0.3 | — | 0.08 | 0.02 | " |
| 51 | " | — | — | — | — | " | " | 0.6 | " | 0.4 | " | " | — | 0.08 | 0.1 | 0.8 | 0.08 | 0.10 | " | " |
| 52 | " | — | — | — | — | " | " | 0.5 | " | 1.2 | 1.2 | 0.05 | — | — | — | — | — | — | — | " |
| 53 | " | — | — | — | — | " | " | 0.4 | 1.1 | 1.0 | — | " | — | — | — | 0.5 | — | — | 0.01 | " |
| 54 | " | — | — | — | — | " | " | 0.6 | " | 0.9 | 1.0 | 0.04 | — | — | — | 0.6 | — | — | " | " |
| 55 | " | — | — | — | — | " | " | 0.5 | 0.7 | 0.8 | 3.0 | — | — | — | — | " | — | — | " | " |
| 56 | " | — | — | — | — | " | " | " | 1.0 | 1.2 | — | 0.07 | — | — | — | " | — | 0.08 | " | " |
| 57 | " | — | — | — | — | " | " | " | " | 1.0 | 1.0 | 0.02 | — | — | — | " | — | 0.10 | 0.02 | " |
| 58 | " | — | — | — | — | " | " | " | 1.1 | " | 3.5 | — | — | — | — | 0.7 | — | " | 0.01 | " |
| 59 | " | — | — | — | — | " | " | 1.0 | 1.2 | " | 1.0 | 0.02 | — | — | — | 0.6 | — | 0.12 | " | " |
| 60 | 11.0 | 9.0 | 8.0 | — | — | 0.3 | " | 0.5 | 1.0 | 0.5 | 1.2 | " | — | — | — | " | — | 0.10 | " | " |
| 61 | 6.0 | 1.0 | 1.5 | — | — | " | " | " | " | " | " | " | — | — | — | " | — | " | " | " |
| 62 | 11.0 | 0.05 | 0.03 | — | — | " | " | " | " | " | " | " | — | — | — | " | — | " | " | " |
| Conventional example | | | | | | | | | | | | | | | | | | | | |
| 63 | 9.8 | — | — | — | — | 0.7 | " | 0.2 | 0.5 | 0.04 | 1.1 | — | — | — | 1.1 | — | — | — | " | " |
| 64 | " | — | — | — | — | " | " | 0.15 | 0.6 | — | " | — | — | — | — | — | — | 0.15 | " | " |

TABLE 44

| No. of fin material | Heating condition for brazing (× 5 min.) | Amount of drooping mm | Electro-conductivity % IACS |
|---|---|---|---|
| Inventive example | | | |
| 1 | 580° C. | 8 | 53 |
| 2 | 575° C. | 10 | " |
| 3 | " | " | 54 |
| 4 | 580° C. | 12 | " |
| 5 | 575° C. | 8 | " |
| 6 | " | " | " |
| 7 | " | " | " |
| 8 | " | " | 53 |
| 9 | " | " | " |
| 10 | 580° C. | 10 | 55 |
| 11 | 575° C. | 8 | " |
| 12 | " | " | 54 |
| 13 | " | " | 53 |
| 14 | " | " | 54 |
| 15 | " | " | 55 |
| 16 | " | " | 53 |
| 17 | 580° C. | 11 | 54 |
| 18 | " | " | 55 |
| 19 | " | " | 54 |
| 20 | 575° C. | 8 | " |
| 21 | " | " | 53 |
| 22 | 580° C. | 11 | 54 |
| 23 | " | " | " |
| 24 | " | " | 53 |
| 25 | 575° C. | 8 | 53 |
| 26 | " | " | 54 |
| 27 | 580° C. | 11 | " |
| 28 | " | " | 53 |
| 29 | " | " | 54 |
| 30 | " | " | " |
| 31 | " | " | 53 |
| 32 | " | " | 54 |
| 33 | 575° C. | 9 | " |

TABLE 44-continued

| No. of fin material | Heating condition for brazing (× 5 min.) | Amount of drooping mm | Electro-conductivity % IACS |
|---|---|---|---|
| Comparative example | | | |
| 34 | 600° C. | 30 | 51 |
| 35 | " | " | 50 |
| 36 | " | 40 | 51 |
| 37 | " | 30 | " |
| 38 | " | 35 | " |
| 39 | " | 45 | " |
| 40 | " | 30 | 52 |
| 41 | " | " | 51 |
| 42 | " | 40 | " |
| 43 | " | 30 | " |
| 44 | " | 35 | " |
| 45 | " | " | " |
| 46 | " | 45 | " |
| 47 | " | 30 | " |
| 48 | " | 35 | " |

TABLE 45

| No. of fin material | Heating condition for brazing (× 5 min.) | Amount of drooping mm | Electro-conductivity % IACS |
|---|---|---|---|
| Comparative example | | | |
| 49 | 600° C. | 30 | 51 |
| 50 | " | " | 50 |
| 51 | " | 35 | 51 |
| 52 | " | 45 | " |
| 53 | " | 40 | 52 |
| 54 | " | 45 | 50 |

TABLE 45-continued

| No. of fin material | Heating condition for brazing (× 5 min.) | Amount of drooping mm | Electro- conductivity % IACS |
|---|---|---|---|
| 55 | " | 50 | 51 |
| 56 | " | 40 | " |
| 57 | 600° C. | 45 | 51 |
| 58 | " | 50 | 50 |
| 59 | " | 45 | 51 |
| 60 | Brazing sheet fin unproducible | | |
| 61 | 610° C. | 50 | 50 |
| 62 | 600° C. | 35 | 52 |
| Conventional example | | | |
| 63 | 610° C. | 45 | 36 |
| 64 | " | 50 | 50 |

As evident from tables 44 and 45, the articles in the inventive examples (No. 1–33) showed both excellent drooping property and excellent electroconductivity. This is because of that the melting point of the brazing material of brazing sheet fin is low, hence the testing temperature was set at lower temperature. Whereas, in the cases of articles in the comparative examples (34–59, 61, 62) and articles in the conventional examples (No. 63, 64), both the drooping property and the electroconductivity were poor. This is because of that the melting point of the brazing material of brazing sheet fin is high, and the testing temperature was set higher at 600° C. or 610° C. being a melting point of brazing material. In the case of article in the comparative example (No. 60), wherein Cu and Zn in the brazing material are added more than those within the range of the invention, rolling cracking occurred, making it impossible to process to the brazing sheet.

EXAMPLE 9

Fin materials A–C and tube materials a–c with compositions shown in Table 46 were combined to assemble the condensers shown in FIG. 2. The fin materials are 0.12 mm thick brazing sheet fin materials cladded both sides of core materials with compositions shown in Table 46 with brazing material in a thickness of 10%, and the tube materials are 16.0 mm wide perforated pipes produced by extruding bare materials comprising alloy compositions shown in Table 46. Onto the condensers, a 10% concentration flux liquor with 3% cesium type flux mixed with potassium fluoride type flux was coated, which was heated in nitrogen gas for brazing. Of the condensers thus obtained, the collapse state of fin and the brazability were observed by external appearance. Moreover, the tensile strength of tubes was measured. Further, with the condensers brazed exactly, the thermal efficiency was measured according to JIS D1618 (Test method of air conditioner for automobiles). The thermal efficiency is shown in comparison with conventional heat-exchanger. The results are shown in table 47 together with the materials and heating conditions.

TABLE 46

| No. of alloy | Composition of brazing material alloy wt. % | | | | | Composition of core material alloy wt. % | | | | | | | | |
|---|---|---|---|---|---|---|---|---|---|---|---|---|---|---|
| | Si | Cu | Zn | Fe | Al | Si | Fe | Cu | Zn | Mn | Ni | Zr | Ti | Al |
| Fin material | | | | | | | | | | | | | | |
| A | 11.0 | 2.5 | 4.0 | 0.2 | Bal. | 0.5 | 1.0 | 0.5 | 1.2 | — | 0.6 | 0.10 | 0.01 | Bal. |
| B | 9.8 | — | — | 0.6 | " | 0.2 | 0.5 | 0.04 | 1.1 | 1.1 | — | — | " | " |
| C | " | — | — | " | " | 0.5 | 1.0 | 0.5 | 1.2 | — | 0.6 | 0.10 | " | " |
| Tube material | | | | | | | | | | | | | | |
| a | — | — | — | — | — | 1.8 | 0.5 | — | — | 1.1 | 0.20 | — | 0.18 | " |
| b | — | — | — | — | — | 1.4 | " | 0.8 | — | " | 0.15 | — | 0.11 | " |
| c | — | — | — | — | — | 0.3 | " | 0.15 | — | " | — | — | 0.01 | " |

TABLE 47

| No. | Alloy no. of fin | Alloy no. of tube | Brazing temperature °C. × 5 min. | Location of collapse | Brazability | Termal efficiency | Tnesile strength of tube |
|---|---|---|---|---|---|---|---|
| Inventive example | | | | | | | |
| ① | A | a | 580 | None | Good | 2.5% More increase than ⑤ | 170 MPa |
| ② | A | b | " | " | " | 2.5% More increase than ⑤ | 220 MPa |
| Comparative example | | | | | | | |
| ③ | C | c | 600 | " | " | 2.5% More | 130 MPa |

TABLE 47-continued

| No. | Alloy no. of fin | Alloy no. of tube | Brazing temperature °C. × 5 min. | Location of collapse | Brazability | Termal efficiency | Tnesile strength of tube |
|---|---|---|---|---|---|---|---|
| ④ | C | b | " | Tube | " | increase than ⑤ Unmeasurable | — |
| Conventional example ⑤ | B | c | " | None | " | Standard | 130 MPa |

*With a tube 4, measurement of thermal efficiency and tensile test could not be carried out because of melting by heating for brazing.

As evident from Table 47, articles No. ① and ② in the inventive examples showed no collapse of fin, good brazability and excellent thermal efficiency. Even if aluminum alloys added with 1.2 wt. % or more of Si may be used for tubes, high strength was maintained without melting.

Whereas, in the cases of articles No. ③ and No. ④ in the comparative examples, conventional brazing material was used for brazing material and the brazing temperature was made to be 600° C. The comparative example ③ showed low strength, and, in the case of article No. ④ in the comparative example, since an aluminum alloy added with 1.2 wt. % or more of Si was used for tube and the brazing temperature was as high as 600° C., the tube ended up to melt.

As described above, in accordance with the invention, since the melting point of brazing material constituting the brazing sheet to be used on fabricating the aluminum alloy heat-exchangers is low, the brazing can be performed at lower temperature, hence the buckling and the decrease in the thermal conductivity of brazing sheet fin material are low, making it possible to thin the wall of fin material. In addition, when using such brazing sheet as a tube material or plate material, these components become high in the strength and excellent in the corrosion resistance and it becomes possible to make the wall of tube material or plate material thin and the strength thereof high, thus exerting remarkable effects on the miniaturization and the lightening in weight of heat-exchangers.

What is claimed is:

1. An aluminum alloy brazing sheet comprising, in weight percent:
    a brazing material, a core material and a sacrificial material;
    said brazing material being an aluminum alloy including from about 7.0% to about 12.0% of Si, over 0.8% to about 8.0% of Cu, and from about 0.05% to about 0.5% of Fe;
    said brazing material further including at least one member selected from the group consisting of from about 0.5% to about 5.5% of Zn, from about 0.002% to about 0.3% of In and from about 0.002% to about 0.3% of Sn;
    a balance of said brazing material being substantially Al and inevitable impurities;
    said core material being an aluminum alloy including from about 0.6% to about 2.5% of Si, from about 0.5% to about 2.5% of Cu co-existing with said Si, and from about 0.05% to about 2.0% of Mn; a balance of said core material being substantially Al and inevitable impurities;
    said sacrificial material being an aluminum alloy including at least one member selected from the group consisting of from about 0.5% to about 6.0% of Zn, from about 0.002 to about 0.3% of In, and from about 0.002% to about 0.3% of Sn; and
    a balance of said sacrificial material being substantially Al and inevitable impurities.

2. The aluminum alloy brazing sheet of claim 1, wherein said core material further includes at least one member selected from the group consisting of from about 0.03 to about 0.5% Mg, from about 0.03% to about 0.3% of Cr, from about 0.03% to about 0.3% of Zr, from about 0.03% to about 0.3% of Ti, and from about 0.03% to about 1.5% Ni.

3. The aluminum alloy brazing sheet of claim 1, wherein said sacrificial material further includes at least one member selected from the group consisting of from about 0.05% to about 2.5% of Mg and from about 0.05% to about 1.6% of Mn.

4. The aluminum alloy brazing sheet of claim 1, wherein:
    said core material further includes at least one member selected from the group consisting of from about 0.03 to about 0.5% Mg, from about 0.03% to about 0.3% of Cr, from about 0.03% to about 0.3% of Zr, from about 0.03% to about 0.3% of Ti, and from about 0.03% to about 1.5% Ni; and
    said sacrificial material further includes at least one member selected from the group consisting of from about 0.05% to about 2.5% of Mg and from about 0.05% to about 1.6% of Mn.

5. An aluminum alloy brazing sheet comprising, in weight percent:
    a brazing material, a core material and a sacrificial material;
    said brazing material being an aluminum alloy including from about 7.0% to about 12.0% of Si, over 0.5% to about 8.0% of Cu, and from about 0.05% to about 0.5% of Fe;
    said brazing material further including at least one member selected from the group consisting of from about 0.5% to about 5.5% of Zn, from about 0.002% to about 0.3% of In, and from about 0.002% to about 0.3% of Sn;
    a balance of said brazing material being substantially Al and inevitable impurities;
    said core material being an aluminum alloy including from about 1.2% to about 2.5% of Si, from about 0.5% to about 2.5% of Cu, and from about 0.05% to about 2.0% of Mn;
    a balance of said core material being substantially Al and inevitable impurities;
    a sacrificial material being an aluminum alloy including at least one member selected from the group consisting of from about 0.5% to about 6.0% of Zn, from about 0.002 to about 0.3% of In, and from about 0.002% to about 0.3 wt. % of Sn; and a balance of said sacrificial material being substantially Al and inevitable impurities.

6. The aluminum alloy brazing sheet of claim 5, wherein said core material further includes at least one member selected from the group consisting of from about 0.03 to about 0.5% Mg, from about 0.03% to about 0.3% of Cr, from about 0.03% to about 0.3% of Zr, from about 0.03% to about 0.3% of Ti, and from about 0.03% to about 1.5% Ni.

7. The aluminum alloy brazing sheet of claim 5, wherein said sacrificial material further includes at least one member selected from the group consisting of from about 0.05% to about 2.5% of Mg and from about 0.05% to about 1.6% of Mn.

8. The aluminum alloy brazing sheet of claim 5, wherein:
said core material further includes at least one member selected from the group consisting of from about 0.03 to about 0.5% Mg, from about 0.03% to about 0.3% of Cr, from about 0.03% to about 0.3% of Zr, from about 0.03% to about 0.3% of Ti, and from about 0.03% to about 1.5% Ni; and
said sacrificial material further includes at least one member selected from the group consisting of from about 0.05% to about 2.5% of Mg and from about 0.05% to about 1.6% of Mn.

9. An aluminum alloy brazing sheet for heat-exchangers comprising, in weight percent;
a brazing material, a core material and a sacrificial material;
said brazing material being an aluminum alloy including from about 7.0% to about 12.0% of Si, over 0.8% to about 8.0% of Cu, and from about 0.05% to about 0.5% of Fe;
said brazing material further including at least one member selected form a group consisting of from about 0.5% to about 5.5% of Zn, from about 0.002% to about 0.3% of In and from about 0.002% to about 0.3% of Sn;
a balance of said brazing material being substantially Al and inevitable impurities;.
said core material being an aluminum alloy including from about 0.6% to about 2.5% of Si, from above 0.8% to about 2.5% of Cu, and from about 0.05% to about 2.0% of Mn;
a balance of said core material being substantially Al and inevitable impurities;
said sacrificial material being an aluminum alloy including at least one member selected from the group consisting of from about 0.5% to about 6.0% of Zn, from about 0.002 to about 0.3% of In, and from about 0.002% to about 0.3% of Sn; and
a balance of said sacrificial material being substantially Al and inevitable impurities.

10. The aluminum alloy brazing sheet of claim 9, wherein said core material further includes at least one member selected from the group consisting of from about 0.03 to about 0.5% Mg, from about 0.03% to about 0.3% of Cr, from about 0.03% to about 0.3% of Zr, from about 0.03% to about 0.3% of Ti, and from about 0.03% to about 1.5% Ni.

11. The aluminum alloy brazing sheet of claim 9, wherein said sacrificial material further includes at least one member selected from the group consisting of from about 0.05% to about 2.5% of Mg and from about 0.05% to about 1.6% of Mn.

12. The aluminum alloy brazing sheet of claim 9, wherein:
said core material further includes at least one member selected from the group consisting of from about 0.03 to about 0.5% Mg, from about 0.03% to about 0.3% of Cr, from about 0.03% to about 0.3% of Zr, from about 0.03% to about 0.3% of Ti, and from about 0.03% to about 1.5% Ni; and
said sacrificial material further includes at least one member selected from the group consisting of from about 0.05% to about 2.5% of Mg and from about 0.05% to about 1.6% of Mn.

13. An aluminum alloy brazing sheet for heat-exchangers comprising, in weight percent:
a brazing material, a core material, and a sacrificial material;
said brazing material being an aluminum alloy including from about 7.0% to about 12.0% of Si, over 0.5% to about 8.0% of Cu, and from about 0.05% to about 0.5% of Fe:
said brazing material further including at least one member selected form a group consisting of from about 0.5% to about 5.5% of Zn, from about 0.002% to about 0.3% of In and from about 0.002% to about 0.3% of Sn;
a balance of said brazing material being substantially Al and inevitable impurities;
said core material being an aluminum alloy including from about 1.2% to about 2.5% of Si, from above 0.8% to about 2.5% of Cu, and from about 0.05% to about 2.0% of Mn;
a balance of said core material being substantially Al and inevitable impurities;
said sacrificial material being an aluminum alloy including at least one member selected from the group consisting of from about 0.5% to about 6.0% of Zn, from about 0.002 to about 0.3% of In, and from about 0.002% to about 0.3% of Sn; and
a balance of said sacrificial material being substantially of Al and inevitable impurities.

14. The aluminum alloy brazing sheet of claim 13, wherein said core material further includes at least one member selected from the group consisting of from about 0.03 to about 0.5% Mg, from about 0.03% to about 0.3% of Cr, from about 0.03% to about 0.3% of Zr, from about 0.03% to about 0.3% of Ti, and from about 0.03% to about 1.5% Ni.

15. The aluminum alloy brazing sheet of claim 13, wherein said sacrificial material further includes at least one member selected from the group consisting of from about 0.05% to about 2.5% of Mg and from about 0.05% to about 1.6% of Mn.

16. The aluminum alloy brazing sheet of claim 13, wherein:
said core material further includes at least one member selected from the group consisting of from about 0.03 to about 0.5% Mg, from about 0.03% to about 0.3% of Cr, from about 0.03% to about 0.3% of Zr, from about 0.03% to about 0.3% of Ti, and from about 0.03% to about 1.5% Ni; and
said sacrificial material further includes at least one member selected from the group consisting of from about 0.05% to about 2.5% of Mg and from about 0.05% to about 1.6% of Mn.

17. An aluminum alloy brazing sheet consisting essentially of, in weight percent:
a brazing material, a core material and a sacrificial material;
said brazing material being an aluminum alloy further consisting essentially of from about 7.0% to about 12.0% of Si, over 0.8%. to about 8.0% of Cu, and from about 0.05% to about 0.5% of Fe;

said brazing material further consisting essentially of at least one member selected from the group consisting of from about 0.5% to about 5.5% of Zn, from about 0.002% to about 0.3% of In and from about 0.002% to about 0.3% of Sn;

a balance of said braising material being substantially Al and inevitable impurities;

said core material being an aluminum alloy further consisting essentially of from about 0.6% to about 2.5% of Si, from about 0.5% to about 2.5% of Cu co-existing with said Si, and from about 0.05% to about 2.0% of Mn;

a balance of said core material being substantially Al and inevitable impurities;

said sacrificial material being an aluminum alloy further consisting essentially of at least one member selected from the group consisting of from about 0.5% to about 6.0% of Zn, from about 0.002 to about 0.3% of In, and from about 0.002% to about 0.3% of Sn; and a balance of said sacrificial material being substantially Al and inevitable impurities.

18. The aluminum alloy brazing sheet of claim 17, wherein said core material is further consisting essentially of at least one member selected from the group consisting of from about 0.03 to about 0.5% Mg, from about 0.03% to about 0.3% of Cr, from about 0.03% to about 0.3% of Zr, from about 0.03% to about 0.3% of Ti, and from about 0.03% to about 1.5% Ni.

19. The aluminum alloy brazing sheet of claim 17, wherein said sacrificial material is further consisting essentially of at least one member selected from the group consisting of from about 0.05% to about 2.5% of Mg and from about 0.05% to about 1.6% of Mn.

20. The aluminum alloy brazing sheet of claim 17, wherein:

said core material is further consisting essentially of at least one member selected from the group consisting of from about 0.03 to about 0.5% Mg, from about 0.03% to about 0.3% of Cr, from about 0.03% to about 0.3% of Zr, from about 0.03% to about 0.3% of Ti, and from about 0.03% to about 1.5% Ni; and said sacrificial material is further consisting essentially of at least one member selected from the group consisting of from about 0.05% to about 2.5% of Mg and from about 0.05% to about 1.6% of Mn.

* * * * *